US012767318B2

(12) United States Patent
Graves et al.

(10) Patent No.: US 12,767,318 B2
(45) Date of Patent: Oct. 20, 2026

(54) SYSTEMS AND METHODS FOR TILT PROPELLERS WITH TILT ACTUATOR GEARBOX AND INTEGRATED INVERTER

(71) Applicant: Archer Aviation Inc., San Jose, CA (US)

(72) Inventors: Scott Graves, Felton, CA (US); Diego Alberto Silva Rodríguez, Lomond, CA (US); Stephen Michael Spiteri, Livermore, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/907,465

(22) Filed: Oct. 4, 2024

(65) Prior Publication Data

US 2025/0178723 A1 Jun. 5, 2025

Related U.S. Application Data

(63) Continuation of application No. PCT/US2023/076271, filed on Oct. 6, 2023.
(Continued)

(51) Int. Cl.
*B64C 11/02* (2006.01)
*B60L 15/06* (2006.01)
(Continued)

(52) U.S. Cl.
CPC .............. *B64C 11/02* (2013.01); *B60L 15/06* (2013.01); *B60L 15/38* (2013.01); *B64C 27/54* (2013.01);
(Continued)

(58) Field of Classification Search
CPC .................................................. B64C 29/0033
See application file for complete search history.

(56) References Cited

U.S. PATENT DOCUMENTS 1,857,849 A * 5/1932 Hojnowski ......... B64C 29/0033
244/93
2,437,330 A 3/1948 Mullgardt
(Continued)

FOREIGN PATENT DOCUMENTS

CN 113335518 A 9/2021
CN 113443136 A 9/2021

OTHER PUBLICATIONS

International Search Report and Written Opinion for counterpart PCT application No. PCT/US2023/076271, dated Mar. 21, 2024, 5 pages.

*Primary Examiner* — William L Gmoser
(74) *Attorney, Agent, or Firm* — Finnegan, Henderson, Farabow, Garrett & Dunner, LLP

(57) ABSTRACT

A tilt apparatus of an aircraft, comprising: a first frame, a second frame moveably coupled to the first frame, a propulsion system coupled to the second frame and configured to move with the second frame, the propulsion system comprising: a propeller, a motor configured to rotate the propeller, and a propulsion inverter configured to supply current to the motor. The tilt apparatus further comprises a tilt actuation system coupled to the second frame and configured to tilt with the second frame with respect to the first frame, the tilt actuation system comprising: a tilt actuator; a tilt actuator inverter configured to supply current to the tilt actuator, and a tilt actuator gearbox coupled to the second frame and configured to tilt with the second frame. The tilt actuator is configured to the tilt the second frame with respect to the first frame via the tilt actuator gearbox.

36 Claims, 16 Drawing Sheets

Related U.S. Application Data

(60) Provisional application No. 63/378,680, filed on Oct. 7, 2022, provisional application No. 63/378,536, filed on Oct. 6, 2022.

(51) Int. Cl.

| | |
|---|---|
| ***B60L 15/38*** | (2006.01) |
| ***B64C 27/54*** | (2006.01) |
| ***B64C 29/00*** | (2006.01) |
| ***B64D 27/30*** | (2024.01) |
| ***B64D 27/31*** | (2024.01) |
| ***B64D 27/34*** | (2024.01) |
| ***B64D 27/359*** | (2024.01) |
| ***B64D 31/18*** | (2024.01) |
| ***B64D 33/08*** | (2006.01) |
| ***B64D 35/02*** | (2024.01) |
| ***B64D 35/021*** | (2024.01) |
| ***B64D 35/026*** | (2025.01) |
| ***F16B 2/06*** | (2006.01) |
| ***F16H 57/08*** | (2006.01) |
| ***H02K 1/27*** | (2022.01) |
| ***H02K 1/32*** | (2006.01) |
| ***H02K 5/124*** | (2006.01) |
| ***H02K 5/20*** | (2006.01) |
| ***H02K 7/08*** | (2006.01) |
| ***H02K 7/116*** | (2006.01) |
| ***H02K 9/19*** | (2006.01) |
| ***H02K 11/33*** | (2016.01) |
| ***H02K 15/03*** | (2006.01) |
| ***H02K 15/035*** | (2025.01) |
| ***H02K 15/40*** | (2025.01) |
| ***H02M 7/5395*** | (2006.01) |
| ***H02P 21/00*** | (2016.01) |
| ***H02P 25/16*** | (2006.01) |
| ***H02P 27/06*** | (2006.01) |
| ***H02P 27/08*** | (2006.01) |
| *H02K 7/00* | (2006.01) |

(52) U.S. Cl.

CPC ...... *B64C 29/0008* (2013.01); *B64C 29/0033* (2013.01); *B64D 27/30* (2024.01); *B64D 27/31* (2024.01); *B64D 27/34* (2024.01); *B64D 27/359* (2024.01); *B64D 31/18* (2024.01); *B64D 33/08* (2013.01); *B64D 35/02* (2013.01); *B64D 35/021* (2024.01); *B64D 35/026* (2024.01); *F16B 2/06* (2013.01); *F16H 57/08* (2013.01); *H02K 1/27* (2013.01); *H02K 1/32* (2013.01); *H02K 5/124* (2013.01); *H02K 5/203* (2021.01); *H02K 7/08* (2013.01); *H02K 7/116* (2013.01); *H02K 9/19* (2013.01); *H02K 11/33* (2016.01); *H02K 15/03* (2013.01); *H02K 15/035* (2025.01); *H02K 15/40* (2025.01); *H02M 7/5395* (2013.01); *H02P 21/50* (2016.02); *H02P 25/16* (2013.01); *H02P 27/06* (2013.01); *H02P 27/08* (2013.01); *B60L 2200/10* (2013.01); *H02K 7/006* (2013.01); *H02K 2215/00* (2021.08)

(56) References Cited

U.S. PATENT DOCUMENTS

| | | | | |
|---|---|---|---|---|
| 4,927,329 | A * | 5/1990 | Kliman | B64C 11/44 416/129 |
| 5,823,470 | A * | 10/1998 | Craig | B64C 29/0033 74/665 GA |
| 6,247,667 | B1 * | 6/2001 | Fenny | B64C 29/0033 244/7 R |
| 6,276,633 | B1 * | 8/2001 | Balayn | B64C 29/0033 244/56 |
| 10,106,255 | B2 | 10/2018 | Covington et al. | |
| 10,421,540 | B1 * | 9/2019 | Koelzer | B64C 27/28 |
| 11,077,937 | B1 * | 8/2021 | Bruell | B64C 11/001 |
| 11,338,914 | B2 | 5/2022 | Groninga et al. | |
| 11,724,802 | B1 * | 8/2023 | Messinger | B64C 29/0033 244/7 C |
| 2016/0076629 | A1 * | 3/2016 | Modrzejewski | F16H 3/48 244/17.11 |
| 2019/0367153 | A1 | 12/2019 | Bishop | |
| 2020/0180756 | A1 * | 6/2020 | Kapeter | B64U 50/13 |
| 2022/0126996 | A1 * | 4/2022 | Long | B64D 27/34 |
| 2022/0250756 | A1 | 8/2022 | Wagner | |
| 2024/0291280 | A1 * | 8/2024 | Naneix | H02J 3/381 |

* cited by examiner

SYSTEMS AND METHODS FOR TILT PROPELLERS WITH TILT ACTUATOR GEARBOX AND INTEGRATED INVERTER

CROSS-REFERENCE TO RELATED APPLICATIONS

This application claims the priority to and benefit of PCT Application PCT/US2023/076271 filed Oct. 6, 2023, titled "Systems and Methods for Tilt Propellers with Tilt Actuator Gearbox and Integrated Inverter" which in turn claims priority to U.S. Provisional Application No. 63/378,536, filed Oct. 6, 2022, titled "Tilt Rotor Systems and Methods for EVTOL Aircraft" and U.S. Provisional Application No. 63/378,680, filed Oct. 7, 2022, titled "Systems and Methods for Improved Propulsion Systems for EVTOL Aircraft". The entire contents of the aforementioned applications are incorporated by reference herein for all purposes.

TECHNICAL FIELD

This disclosure relates generally to the field of powered aerial vehicles. More particularly, and without limitation, the present disclosure relates to innovations in tilt-propeller aircraft that use electrical propulsion systems. Certain aspects of the present disclosure generally relate to tilt actuator systems for tilt propellers. Other aspects of the present disclosure generally relate to improvements in tilt actuation systems that may be used in other types of vehicles but provide particular advantages in aerial vehicles.

SUMMARY

Some embodiments of the present disclosure provide a tilt actuation apparatus for tilting a propulsion system of an aircraft. The tilt actuation apparatus may comprise: a tilt actuator comprising a rotor; a planetary gear set comprising a sun gear, a plurality of planetary gears, a planetary carrier, and a ring gear, wherein the rotor is coupled to the sun gear; a worm gear concentrically coupled to an output of the planetary gear set; a worm wheel meshed with the worm gear, a gear shaft concentrically coupled to the worm wheel; a pinion concentrically coupled to the gear shaft; a sector gear meshed with the pinion; and an output shaft coupled to the sector gear, the output shaft configured to be fixed to a frame of the aircraft.

Some embodiments of the present disclosure provide a tilt apparatus of an aircraft. The tilt apparatus may comprise: a first frame; a second frame moveably coupled to the first frame; a propulsion system mounted on the second frame; a tilt actuator coupled to the second frame, the tilt actuator comprising a rotor; a planetary gear set comprising a sun gear, a plurality of planetary gears, a planetary carrier, and a ring gear, wherein the rotor is coupled to the sun gear; a worm gear concentrically coupled to an output of the planetary gear set; a worm wheel meshed with the worm gear, a gear shaft concentrically coupled to the worm wheel; a pinion concentrically coupled to the gear shaft; a sector gear meshed with the pinion; an output shaft coupled to the sector gear, the output shaft being fixed to the first frame.

Some embodiments of the present disclosure provide a tilt apparatus of an aircraft. The tilt apparatus may comprise: a first frame; a second frame moveably coupled to the first frame; a propulsion system mounted on the second frame; a first tilt actuator coupled to the second frame, the first tilt actuator comprising a first rotor; a first planetary gear set comprising a first sun gear, a first plurality of planetary gears, a first planetary carrier, and a first ring gear, wherein the first rotor is coupled to the first sun gear; a first worm gear concentrically coupled to an output of the first planetary gear set; a first worm wheel meshed with the first worm gear, a first gear shaft concentrically coupled to the first worm wheel; a first pinion concentrically coupled to the first gear shaft; a first sector gear meshed with the first pinion; a first output shaft coupled to the first sector gear, the first output shaft being fixed to the first frame; a second tilt actuator comprising a second rotor; a second planetary gear set comprising a second sun gear, a second plurality of planetary gears, a second planetary carrier, and a second ring gear, wherein the second rotor is coupled to the second sun gear; a second worm gear concentrically coupled to an output of the second planetary gear set; a second worm wheel meshed with the second worm gear; a second gear shaft concentrically coupled to the second worm wheel; a second pinion concentrically coupled to the second gear shaft; a second sector gear meshed with the second pinion; and a second output shaft coupled to the second sector gear, the second output shaft being fixed to the first frame.

Some embodiments of the present disclosure provide a tilt apparatus of an aircraft. The tilt apparatus may comprise: a first frame; a second frame moveably coupled to the first frame; a propulsion system mounted on the second frame; a first tilt actuator; a tilt actuator gearbox coupled to the second frame, the tilt actuator gearbox comprising: a first gear stage coupled to the first tilt actuator; a second gear stage coupled to the first gear stage; and a third gear stage coupled to the second gear stage and the first frame.

Some embodiments of the present disclosure provide a tilt apparatus of an aircraft. The tilt apparatus may comprise: a first frame; a second frame moveably coupled to the first frame; a propulsion system coupled to the second frame and configured to move with the second frame, the propulsion system comprising: a propeller; a motor configured to rotate the propeller, and a propulsion inverter configured to supply current to the motor; a tilt actuation system coupled to the second frame and configured to move with the second frame with respect to the first frame, the tilt actuation system comprising: a tilt actuator; a tilt actuator inverter configured to supply current to the tilt actuator, and a tilt actuator gearbox coupled to the second frame, wherein the tilt actuator is configured to the tilt the second frame with respect to the first frame via the tilt actuator gearbox.

Some embodiments of the present disclosure provide a method for tilting a propulsion system of an aircraft. The method may comprise: tilting a first frame with respect to a second frame using a tilt actuation apparatus, wherein: the first frame is coupled to a body of the aircraft, and the second frame is coupled to a propeller, a motor assembly configured to rotate the propeller, and the tilt actuation apparatus. The tilt actuation apparatus may comprise: a tilt actuator comprising a rotor; a planetary gear set comprising a sun gear, a plurality of planetary gears, a planetary carrier, and a ring gear, wherein the rotor is coupled to the sun gear; a worm gear concentrically coupled to an output of the planetary gear set; a worm wheel meshed with the worm gear, a gear shaft concentrically coupled to the worm wheel; a pinion concentrically coupled to the gear shaft; a sector gear meshed with the pinion; an output shaft coupled to the sector gear, the output shaft configured to be fixed to a frame of the aircraft.

BRIEF DESCRIPTIONS OF THE FIGURES

DETAILED DESCRIPTION

Figure 1A:
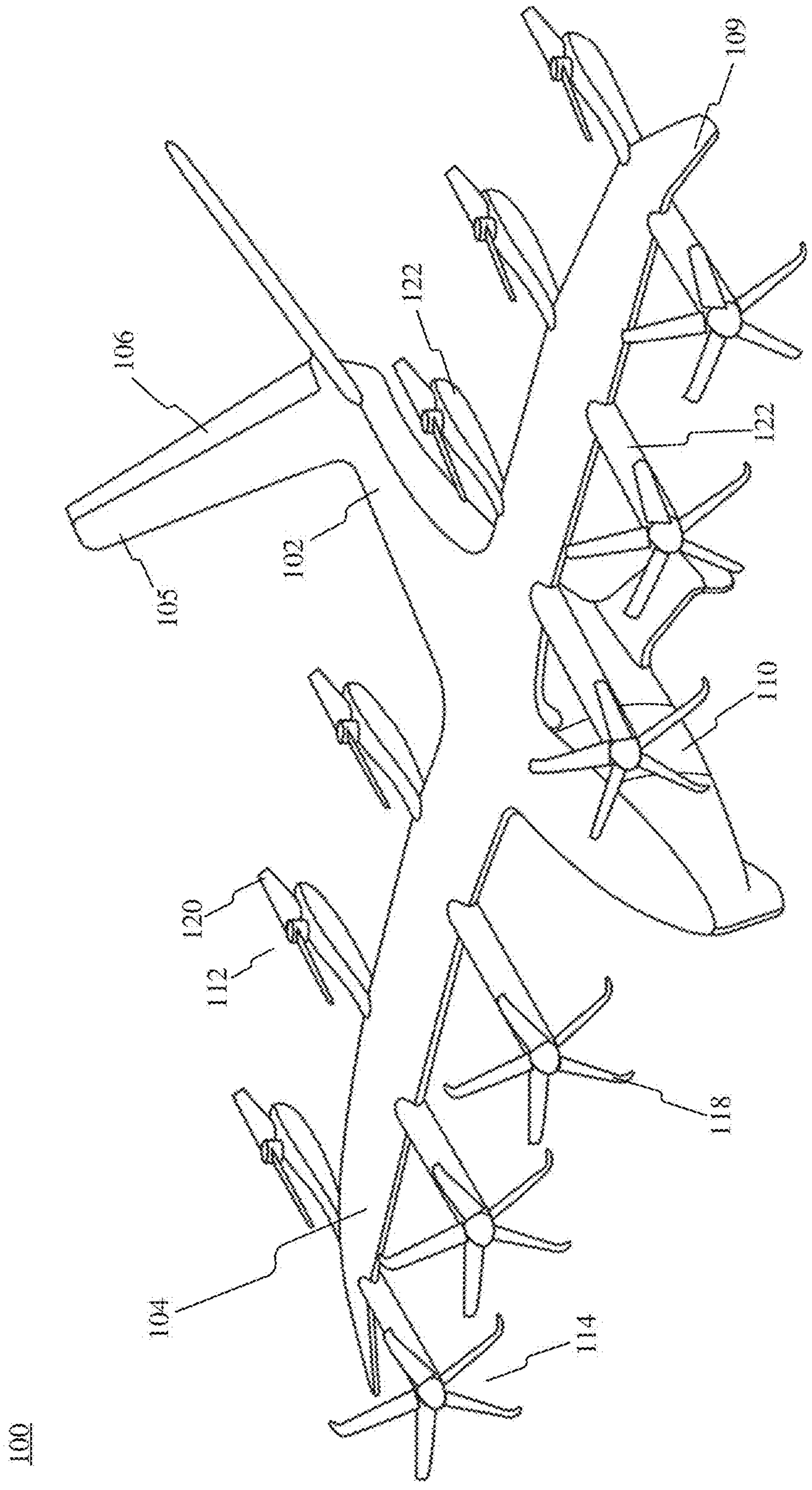
FIG. 1A illustrates an example VTOL aircraft in a cruise configuration, consistent with embodiments of the present disclosure.

The present disclosure addresses components of electric vertical takeoff and landing (eVTOL) aircraft primarily for use in a non-conventional aircraft. For example, the eVTOL aircraft of the present disclosure may be intended for frequent (e.g., over 50 flights per workday), short-duration flights (e.g., less than 100 miles per flight) over, into, and out of densely populated regions. The aircraft may be intended to carry 4-6 passengers or commuters who have an expectation of a low-noise and low-vibration experience. Accordingly, it may be desired that their components are configured and designed to withstand frequent use without wearing, that they generate less heat and vibration, and that the aircraft include mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms. For example, it may be desired for safety reasons that the aircraft are propelled by a distributed propulsion system, avoiding the risk of a single point of failure, and that they are capable of conventional takeoff and landing on a runway. Moreover, it may be desired that the aircraft can safely vertically takeoff and land from and into relatively restricted spaces (e.g., vertiports, parking lots, or driveways) compared to traditional airport runways while transporting around 4-6 passengers or commuters with accompanying baggage. These use requirements may place design constraints on aircraft size, weight, operating efficiency (e.g., drag, energy use), which may impact the design and configuration of the aircraft components.

Disclosed embodiments provide new and improved configurations of aircraft components that are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of eVTOL aircraft components.

In some embodiments, the eVTOL aircraft of the present disclosure may be designed to be capable of both vertical and conventional takeoff and landing, with a distributed electrical propulsion system enabling vertical flight, forward flight, and transition. Thrust may be generated by supplying high voltage electrical power to the electrical engines of the distributed electrical propulsion system, which each may convert the high voltage electrical power into mechanical shaft power to rotate a propeller. Embodiments disclosed herein may involve optimizing the energy density of the electrical propulsion system. Embodiments may include an electrical engine connected to an onboard electrical power source, which may include a device capable of storing energy such as a battery or capacitor, or may include one or more systems for harnessing or generating electricity such as a fuel powered generator or solar panel array. Some disclosed embodiments provide for weight reduction and space reduction of components in the aircraft, thereby increasing aircraft efficiency and performance. Given focus on safety in passenger transportation, disclosed embodiments implement new and improved safety protocols and system redundancy in the case of a failure, to minimize any single points of failure in the aircraft propulsion system. Some disclosed embodiments also provide new and improved approaches to satisfying aviation and transportation laws and regulations.

In preferred embodiments, the distributed electrical propulsion system may include twelve electrical engines, which may be mounted on booms forward and aft of the main wings of the aircraft. The forward electrical engines may be tiltable mid-flight between a horizontally oriented position (e.g., to generate forward thrust) and a vertically oriented position (e.g., to generate vertical lift). The forward electrical engines may be of a clockwise type or counterclockwise type in terms of direction of propeller rotation. The aft electrical engines may be fixed in a vertically oriented position (e.g., to generate vertical lift). They may also be of a clockwise type or counterclockwise type in terms of direction of propeller rotation. In some embodiments, an aircraft may possess various combinations of forward and aft electrical engines. For example, an aircraft may possess six forward and six aft electrical engines, four forward and four aft electrical engines, or any other combination of forward and aft engines, including embodiments where the number of forward electrical engines and aft electrical engines are not equivalent. In some embodiments, an aircraft may possess four forward and four aft propellers, where at least four of these propellers comprise tiltable propellers.

In preferred embodiments, for a vertical takeoff and landing (VTOL) mission, the forward electrical engines as well as aft electrical engines may provide vertical thrust during takeoff and landing. During flight phases where the aircraft is in forward flight-mode, the forward electrical engines may provide horizontal thrust, while the propellers of the aft electrical engines may be stowed at a fixed position in order to minimize drag. The aft electrical engines may be actively stowed with position monitoring. Transition from vertical flight to horizontal flight and vice-versa may be accomplished via the tilt propeller subsystem. The tilt propeller subsystem may redirect thrust between a primarily vertical direction during vertical flight mode to a mostly horizontal direction during forward-flight mode. In some embodiments, the transition mode of flight may be utilized for more than a brief change between lift and cruise. For example, tilt propellers may be maintained at intermediate angles between substantially horizontal and substantially vertical, in combination with operating the lift propellers or independently of them. This may allow the aircraft to travel at speeds well below the stall speed of a comparably sized conventional airplane, and to move seamlessly above and below such a speed without any disruption to the passenger experience. A variable pitch mechanism may change the forward electrical engine's propeller-hub assembly blade collective pitch angles for operation during the hover-phase, transition phase, and cruise-phase.

In some embodiments, in a conventional takeoff and landing (CTOL) mission, the forward electrical engines may provide horizontal thrust for wing-borne take-off, cruise, and landing. In some embodiments, the aft electrical engines may not be used for generating thrust during a CTOL mission and the aft propellers may be stowed in place.

In some embodiments, an electric engine may be housed or connected to a boom of an aircraft and include a motor, inverter, and gearbox. In some embodiments, the motor, inverter, and gearbox may be interfaced such that they share a central axis. In some embodiments, the torque originating in the motor may be sent away from the propellers of the propulsion system and to a gearbox. In some embodiments, a gearbox may provide a gear reduction and then send the torque, via a main shaft, back through a bearing located inside the motor and to the propeller. In some embodiments, an inverter may be mounted on the rear of a gearbox such that a main shaft does not travel through the inverter when outputting torque to the propeller. In some embodiments, the motor, gearbox, and inverter may be interfaced such that a coolant, such as oil, may be used to service the motor, inverter, and/or gearbox, while sharing a common heat exchanger.

In some embodiments, a tilt propeller system may include a linear or rotary actuator to change the orientation of a propulsion system during operation. In some embodiments, the pitch of the propulsion system may be changed as a function of the orientation of the propulsion system. In some embodiments, a rotary actuator may include a motor, inverter, and gearbox. In some embodiments, a gearbox may include various types of gears interfacing to provide a gear reduction capable of orienting the propulsion system. In some embodiments, a tilt propeller system may include a redundant configuration such that multiple motors, inverters, and gearboxes are present and interface using a gear. In some embodiments, a configuration utilizing multiple motors, gearboxes, and inverters may allow a failed portion of the redundant configuration to be driven by the motor, inverter, and gearbox of another portion of the configuration. In some embodiments, a gearbox configuration may also allow the tilt propeller system to maintain a propulsion system orientation with the help of, or without, additional power being provided by the system.

In some embodiments, an electrical propulsion system as described herein may generate thrust by supplying High Voltage (HV) electric power to an electric engine, which in turn converts HV power into mechanical shaft power which is used to rotate a propeller. As mentioned above, an aircraft as described herein may possess multiple electric engines which are boom-mounted forward and aft of the wing. The amount of thrust each electric engine generates may be governed by a torque command from the Flight Control System (FCS) over a digital communication interface to each electric engine. Embodiments may include forward electric engines, and may be able to alter their orientation, or tilt. Additional embodiments include forward engines that may be a clockwise (CW) type or counterclockwise (CCW) type. The forward electric engine propulsion subsystem may consist of a multi-blade adjustable pitch propeller, as well as a variable pitch subsystem.

In some embodiments, an aircraft may include aft engines, or lifters, that can be of a clockwise (CW) type or counterclockwise (CCW) type. Additional embodiments may include aft electric engines that utilize a multi-blade fixed pitch propeller.

As described herein, the orientation and use of electric propulsion systems may change throughout the operation of the aircraft. In some embodiments, during vertical takeoff and landing, the forward propulsion systems as well as aft propulsion systems may provide vertical thrust during take-off and landing. Some embodiments may include a transition from vertical flight to horizontal flight and vice-versa. In some embodiments, the transitions may be accomplished via the tilt propeller system (TPS). The TPS redirects thrust between a primarily vertical direction during vertical flight mode to a mostly horizontal direction during forward-flight mode. Additional embodiments may include a variable pitch mechanism that may change the forward propulsion system propeller-hub assembly blade collective angles for operation during the hover-phase, cruise-phase and transition phase. Some embodiments may include a Conventional Takeoff and Landing (CTOL) configurations such that the tilters provide horizontal thrust for wing-borne take-off, cruise and landing. The aft electronic engines are not used for generating thrust during a CTOL mission and the aft propellers are stowed in place.

As disclosed herein, an electrical engine may include an inverter and motor; or inverter, gearbox, and motor across various configurations, such as representative configurations as described herein. For example, an electrical engine may include an electrical motor, gearbox, and inverter that all share the same central axis. Additionally, the central axis may be configured along an axis of an output shaft going to the propeller of the aircraft. In such an exemplary configuration, the motor, gearbox, and inverter would all share the output shaft as a central axis and would be circularly oriented around the output shaft. Additional embodiments may include a motor, gearbox, and inverter that are mounted together in a sequence, or a configuration where some of the components are mounted together, such as the motor and gearbox, and another component is located elsewhere, such as the inverter, but wiring systems are used to connect the electrical engine.

As mentioned above, an electrical engine for an aircraft as described here may include some or all of a motor, inverter, and gearbox. Various configurations may include an inverter and motor such that the output shaft of a motor directly provides the speed and torque for a propeller shaft. Additional embodiments of an electrical engine may include a motor, inverter, and a gearbox, wherein the output of a motor may travel through a gearbox that is connected to the output shaft for the propeller; a motor, inverter, and gearbox wherein the output from the motor travels away from the propeller, through a gearbox, where the output shaft for the propeller travels back through the gearbox and motor to the propeller. As described herein, an electrical engine may account for any combination or orientation of some or all of a motor, inverter, and gearbox. Additionally, each configuration or orientation of the electrical engine as disclosed herein may include cooling via air-cooling, coolant liquid, or a mixture of both.

For example, a configuration of an electrical engine may include a motor and inverter wherein the motor is in between the propeller of the aircraft and the inverter. Additionally, a motor may include a gearbox. Further, an inverter may share the same central axis as a motor wherein the inverter may be located in an enclosure that is cantilevered off of the rear of the motor and may be air cooled. It is recognized that such an inverter orientation may not be an optimum configuration in terms of the enclosure required to achieve such a cantilevered orientation. Additionally, a motor in this configuration utilizing air cooling may comprise potting material and air fins to assist with cooling of the motor may lead to an even larger increase in mass of the system.

Some embodiments may include an electrical engine, wherein inverter modules may be mounted on the outside of a motor enclosure. Additional embodiments may include an electrical engine wherein an inverter may be mounted on top of an electrical motor such that the air-cooling fins of the inverter are underneath the propeller. Further embodiments may include an inverter mounted to the back of a motor with air-cooling fins facing out radially, an inverter mounted to the front of a motor with the air-cooling fins facing out radially, an inverter mounted to a motor where the inverter is cooled by a liquid, such as oil, or any other position of the inverter relative to a motor.

Embodiments of an electrical motor may comprise a stator enclosure, a wound stator assembly, a rotor, various bearings, and any additional components such that to assist in transferring the speed and torque generated by the motor to a propeller.

It is understood that an electrical engine may generate heat during operation and may comprise a heat management system to ensure components of the electrical engine do not fail during operation. In some embodiments, coolant may be used and circulated throughout individual components of the engine, such as an inverter, gearbox, or motor, through some of the components, or through all of the components of the engine to assist with managing the heat present in the engine. Additional embodiments may include using air cooling methods to cool the electrical engine or using a mixture of coolant and air to manage the heat generated during operation in the electrical engine. In some embodiments, the coolant being used may also be the same liquid that is being used as lubricant throughout the inverter, gearbox, or motor. For example, the inverter, gearbox, and motor may be cooled using a liquid or air, or a mixture of air and liquid cooling could be used, such as cooling the motor using air cooling and using liquid cooling in the inverter and gearbox, or any other combination of air and liquid cooling across the inverter, gearbox, and motor or even subsets of those components.

In some embodiments, oil may be used as a lubricant throughout an electrical engine and may also be used as coolant fluid to assist in managing the heat generated by the engine during operation. Further to this example, different amounts of oil may be used to act as both lubricant and coolant fluid in the electrical engine, such as less than one quart, less than two quarts, or any other amount of oil needed to lubricate and cool the electrical engine, in combination with or without the assistance of air cooling. As has been disclosed herein, an electrical engine may have different primary functionalities such as being used only for lifting and landing, and as such only being used in one orientation, or being used during all stages of flight such as lifting, landing, and in-flight. An engine that is used in all stages of flight may experience various orientations throughout flight and may comprise more lubricant and coolant than the engine only used in one orientation.

Certain flight design considerations take on a special importance in the field of electric and VTOL aircraft. For example, it may be important in VTOL design to configure systems such that they are as lightweight, simple, energy efficient, and fail-safe. Therefore, it may be desirable to configure systems with a simple and robust design, for example by eliminating heavy actuators, power sources, and control components, as well as wiring, tubing or other conduits and electrical connections. Such simplifications may serve the dual purposes of reducing weight and eliminating failure points.

For example, it may be desirable to provide a simple and robust tilt actuation system for moving a tilt propeller between a lift configuration and a cruise configuration. However, it may also be desirable to provide a backup system or other form of redundancy in the event of a failure of a primary tilt actuation system. Further, it may be desirable to provide a system that can maintain a satisfactory level of control over the tilt apparatus in the event of a failure, rather than simply preventing a complete loss of the tilt propeller. It may be difficult to reconcile these competing interests within a compact, lightweight and reliable design.

Embodiments of the present disclosure may provide a tilt actuation system having one or more rotary actuators. For example, in some embodiments, the tilt actuation system may comprise two rotary actuators and a gear reduction system having a dedicated load path for each. The gear reduction system may couple the two rotary actuators such that either rotary actuator can transmit torque through both load paths in the event that the other rotary actuator fails. The gear reduction system may comprise worm gears or other gears configured to achieve a high gear reduction and prevent or reduce backdriving. The rotary actuator design may allow the actuators to be co-packaged with other elements, such as an inverter of the tilt propeller motor assembly, to share power and control components. Thus, tilt actuation systems according to embodiments of the present disclosure may be compact, lightweight and fail-safe.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 1B:
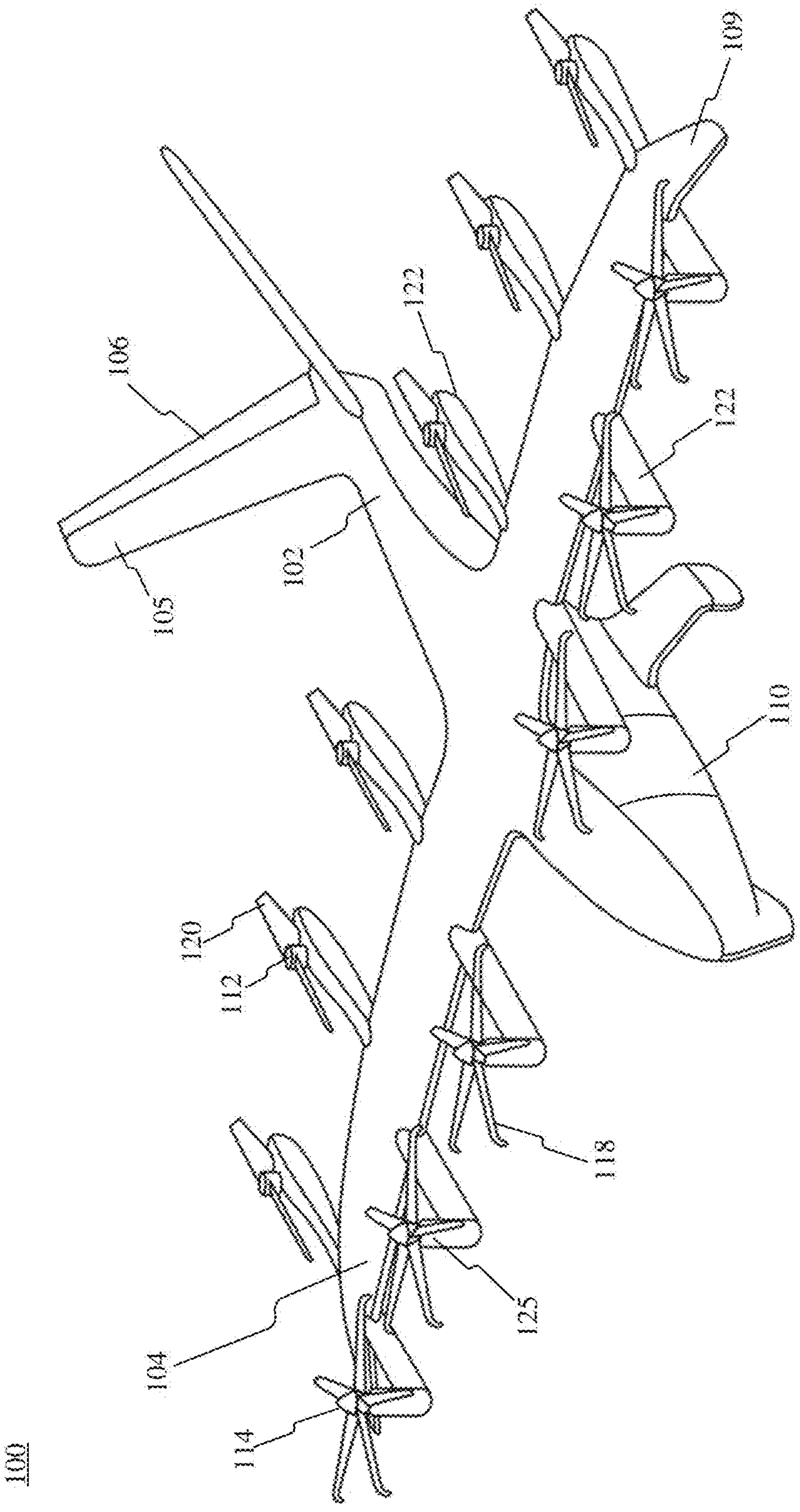
FIG. 1B illustrates an example VTOL aircraft in a lift configuration, consistent with embodiments of the present disclosure.

FIGS. 1A-1B illustrate a VTOL aircraft 100 in a cruise configuration and a vertical take-off, landing and hover configuration (also referred to herein as a “lift” configuration), respectively, consistent with embodiments of the present disclosure. The aircraft 100 may include a fuselage 102, wings 104 mounted to the fuselage 102, tail 105, and one or more rear stabilizers 106 mounted to the tail 105 or the rear of the fuselage 102. A plurality of lift propellers 112 may be mounted to wings 104 and configured to provide lift for vertical take-off, landing and hover. A plurality of tilt propellers 114 may be mounted to wings 104 and may be tiltable between the cruise configuration in which they provide forward thrust to aircraft 100 for horizontal flight, as shown in FIG. 1A, and the lift configuration in which they provide a portion of the lift required for vertical take-off, landing and hovering, as shown in FIG. 1B. As used herein, a lift configuration may refer to a tilt propeller orientation in which the tilt propeller thrust is providing primarily lift to the aircraft. A cruise configuration may refer to a tilt propeller orientation in which the tilt propeller thrust is providing primarily forward thrust to the aircraft. Alternatively, a cruise configuration may refer to a configuration in which a lift propeller is stowed.

In some embodiments, lift propellers 112 may be configured for providing lift only, with all propulsion being provided by the tilt propellers. Accordingly, lift propellers 112 may be in fixed positions and may only generate thrust during take-off, landing and hover. Meanwhile, tilt propellers 114 may be tilted to lift configurations in which their thrust is directed downwardly for providing additional lift.

For forward flight, tilt propellers 114 may tilt from their lift configurations to their cruise configurations. In other words, the tilt angle of tilt propellers 114 may be varied from an orientation in which the tilt propeller thrust is directed downward (to provide lift during vertical take-off, landing and hover) to an orientation in which the tilt propeller thrust is directed rearward (to provide forward thrust to aircraft 100). The tilt propellers may tilt about axes that may be perpendicular to the forward direction of the aircraft 100. When the aircraft 100 is in full forward flight during the cruise configuration, lift may be provided entirely by wings 104. Meanwhile, lift propellers 112 may be shut off. The blades 120 of lift propellers 112 may be locked in low-drag positions for aircraft cruising. In some embodiments, lift propellers 112 may each have two blades 120 that may be locked for cruising in minimum drag positions in which one blade is directly in front of the other blade as illustrated in FIG. 1A. In some embodiments, lift propellers 112 have more than two blades. In some embodiments, tilt propellers 114 include more blades 118 than lift propellers 112. For example, as illustrated in FIGS. 1A-1B, lift propellers 112 may each include, e.g., two blades and tilt propellers 114 may each include, e.g., five blades. In some embodiments, tilt propellers 114 may have, e.g., from 2 to 5 blades.

In some embodiments, the aircraft may include only one wing 104 on each side of fuselage 102 (or a single wing that extends across the entire aircraft) and at least a portion of lift propellers 112 may be located rearward of wings 104 and at least a portion of tilt propellers 114 may be located forward of wings 104. In some embodiments, all of lift propellers 112 may be located rearward of wings 104 and all of tilt propellers 114 may be located forward of wings 104. According to some embodiments, all lift propellers 112 and tilt propellers 114 may be mounted to the wings—i.e., no lift propellers or tilt propellers may be mounted to the fuselage. In some embodiments, lift propellers 112 may be all located rearwardly of wings 104 and tilt propellers 114 may be all located forward of wings 104. According to some embodiments, all lift propellers 112 and tilt propellers 114 may be positioned inwardly of the wing tips 109.

In some embodiments, lift propellers 112 and tilt propellers 114 may be mounted to wings 104 by booms 122. Booms 122 may be mounted beneath wings 104, on top of the wings, and/or may be integrated into the wing profile. In some embodiments, one lift propeller 112 and one tilt propeller 114 may be mounted to each boom 122. Lift propeller 112 may be mounted at a rear end of boom 122 and tilt propeller 114 may be mounted at a front end of boom 122. In some embodiments, lift propeller 112 may be mounted in a fixed position on boom 122. In some embodiments, tilt propeller 114 may mounted to a front end of boom 122 via a hinge. Tilt propeller 114 may be mounted to boom 122 such that tilt propeller 114 is aligned with the body of boom 122 when in the cruise configuration, forming a continuous extension of the front end of boom 122 that minimizes drag for forward flight.

In some embodiments, aircraft 100 may include, e.g., one wing on each side of fuselage 102 or a single wing that extends across the aircraft. According to some embodiments, the at least one wing 104 is a high wing mounted to an upper side of fuselage 102. According to some embodiments, the wings include control surfaces, such as flaps, ailerons or flaperons. According to some embodiments, the wings may have curved wing tips 109 for reduced drag during forward flight.

In some embodiments, rear stabilizers 106 include control surfaces, such as one or more rudders, one or more elevators, and/or one or more combined rudder-elevators. The wing(s) may have any suitable design. For example, the wings have a tapering leading edge or a tapering trailing edge. In some embodiments, the wings may have a substantially straight leading edge in the central section of wings 104.

Aircraft 100 may include at least one door 110 for passenger entry and exit. In some embodiments, the door 110 may be located beneath and forward of wings 104 as seen in FIGS. 1A-1B.

Further discussion of VTOL aircraft may be found in U.S. Patent Publication No. 2021/0362849, which is incorporated by reference in its entirety for all purposes.

As discussed above, it may be desirable to provide a simple and robust tilt actuation system for moving a tilt propeller between a lift configuration and a cruise configuration. Embodiments of the present disclosure may provide a rotary actuator design that is compact, lightweight, efficient and fail-safe.

A. Example Tilt Propeller Embodiments

Figure 2A:
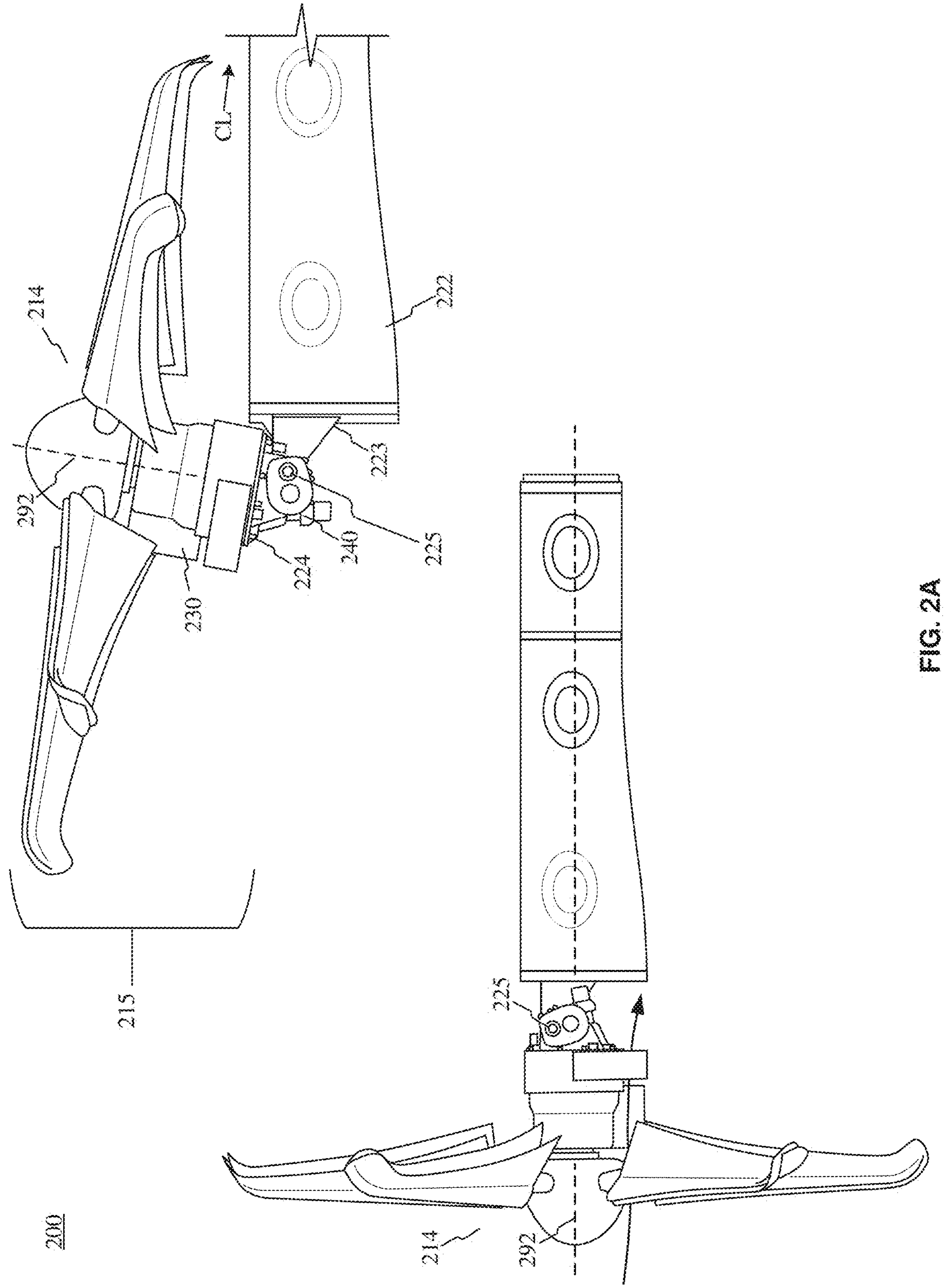
FIGS. 2A-2B illustrate example tilt apparatus in a VTOL aircraft, consistent with embodiments of the present disclosure.
Figure 2B:
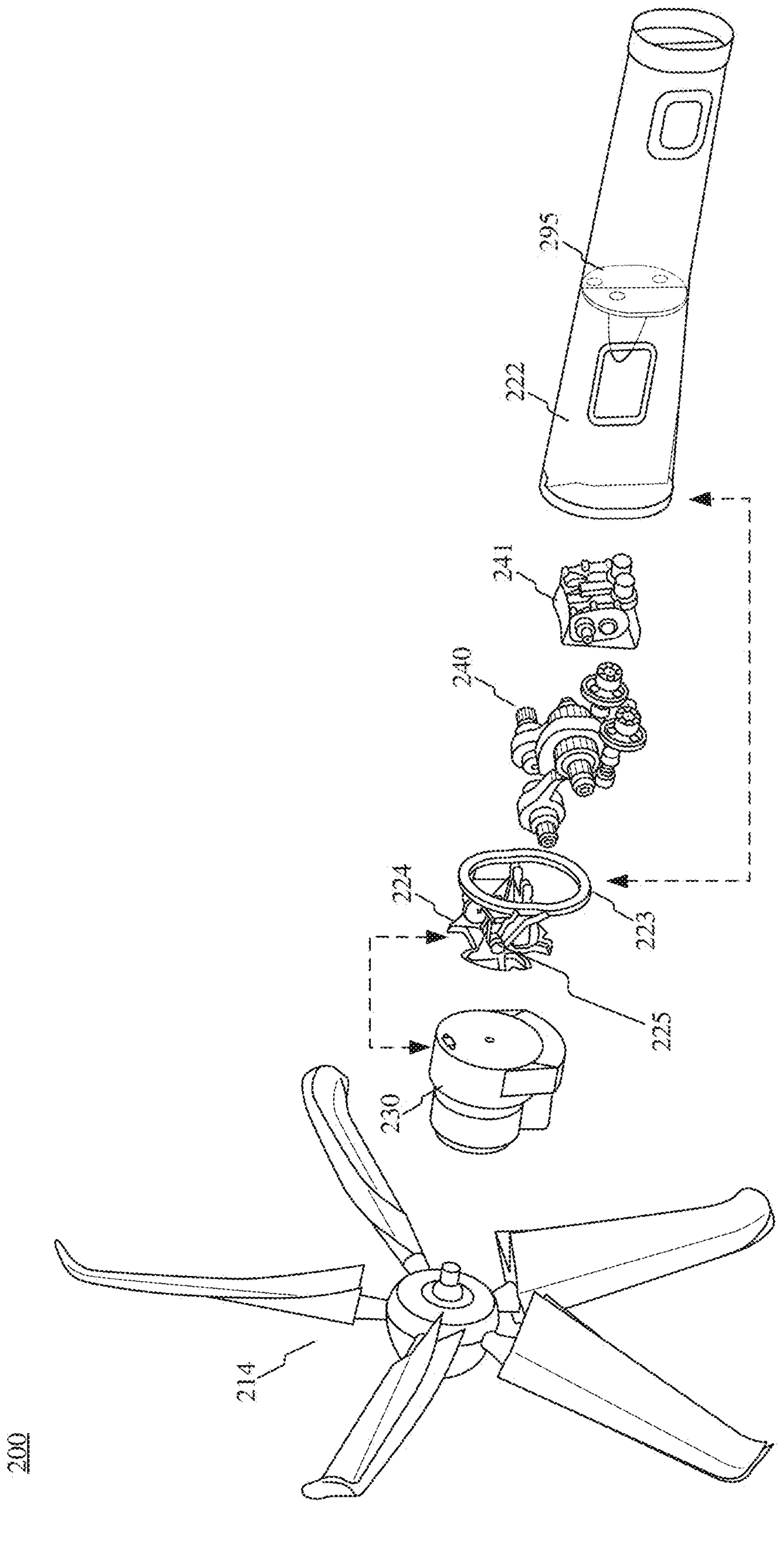

FIGS. 2A-2B illustrate example tilt apparatus in a VTOL aircraft 200, consistent with embodiments of the present disclosure. VTOL aircraft 200 may be, e.g., similar to VTOL aircraft 100 of FIGS. 1A-1B. In FIG. 2A-2B and below, corresponding or similar elements may be labeled with corresponding numbers using the instant Figure number as the leading digit(s). For example, in some embodiments, boom 222 of FIGS. 2A-2B may be similar to boom 122 of FIGS. 1A-1B. In some cases, corresponding numbers may represent unrelated features.

FIG. 2A illustrates a tilt apparatus in a lift configuration (at top) and in a cruise configuration (at bottom). The tilt apparatus may comprise, e.g., a tilt propeller 214, a motor assembly 230 coupled to the lift propeller and configured to rotate the lift propeller 214 about a propeller rotation axis 292, and a nacelle (omitted for clarity) around motor assembly 230. The motor assembly 230 and tilt propeller 214 may comprise a propulsion system 215 of the tilt apparatus. The tilt apparatus may further comprise a first frame 223 mounted on a structural body of the VTOL aircraft. For example, the first frame 223 may be mounted to a boom 222. A second frame 224 may be moveably coupled to the first frame 223 at a pivot 225. Second frame 224 may be configured to support, e.g., motor assembly 230 and tilt propeller 214. The tilt apparatus may further comprise a tilt actuation assembly 240 configured to tilt second frame 224 with respect to first frame 223 about pivot 225. For example, tilt actuation assembly 240 may comprise one or more actuators and a gear reduction system configured to exert a torque on first frame 223 about pivot 225 to tilt second frame 224. The tilt actuation assembly 240 may be capable of actuating motor assembly 230 and tilt propeller 214 without excessive external connections to the boom for supplying power, control signals or even mechanical actuation. For example, as compared to providing a linear actuator between the first frame 223 and second frame 224, tilt actuation assembly 240 may provide a compact design that leaves ample space for, e.g., airflow in the cruise configuration (as illustrated schematically by the solid arrow at the bottom of FIG. 2A). Further, tilt actuation assembly 240 may be powered and controlled locally by components that are supported on the second frame 224 to minimize cumbersome connections between the first and second frames and eliminate potential failure points.

FIG. 2B illustrates an exploded view of the tilt apparatus of FIG. 2A. As further discussed below, tilt actuation assembly 240 may be mounted to the second frame 224 and coupled to the first frame 223 at pivot 225. A tilt actuation housing 241 may engage with second frame 224 to cover tilt actuation assembly 240 and protect it from the external environment. As shown by dashed lines, the first frame 223 may be coupled to, e.g., a front portion of boom 222 or another structural body of VTOL aircraft 200, and second frame 224 may be mounted to a bottom surface of motor assembly 230, such as by bolts or other fasteners.

Figure 3:
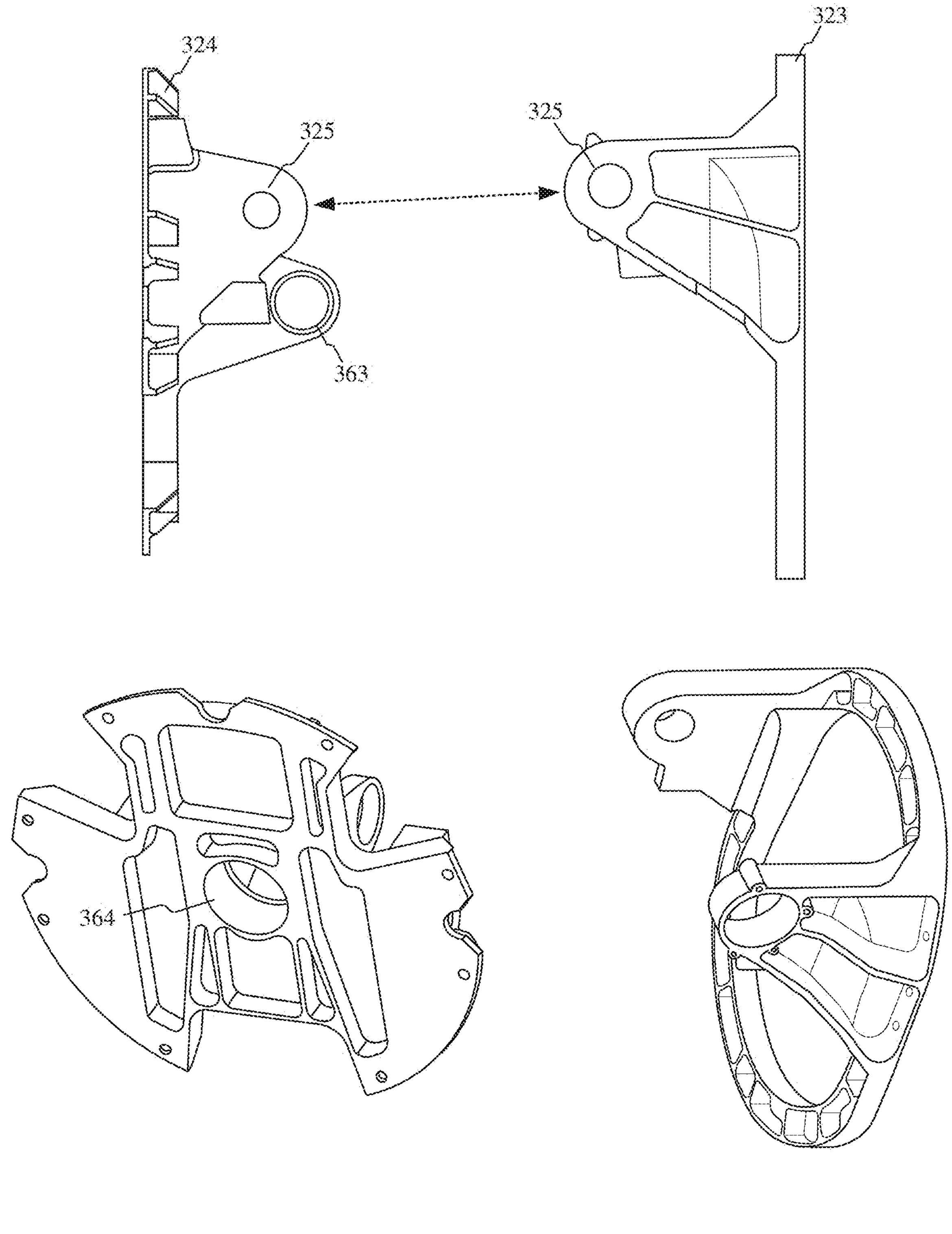
FIG. 3 illustrates first and second frames in a VTOL aircraft, consistent with embodiments of the present disclosure.

FIG. 3 illustrates magnified views of a first frame 323 and a second frame 324 in an aircraft, such as VTOL aircraft 100, consistent with embodiments of the present disclosure. First frame 323 and a second frame 324 may comprise corresponding bores at pivot 325, and may be joined together by, e.g., an output shaft as discussed below. In some embodiments, second frame 324 may comprise further bores for, e.g., supporting components of a tilt actuation assembly or accommodating a blade pitch control assembly. For example, in some embodiments a blade pitch control assembly may comprise a linked tilt pitch configured to passively actuate a collective blade pitch of the propellers as a function of the tilt angle of a tilt actuation assembly. In some embodiments, second frame 324 may comprise a cam bore 363 for mounting a gear shaft of the tilt actuation assembly or a cam shaft for supporting a cam of the blade pitch control assembly. In some embodiments, a single shaft may comprise the gear shaft and the cam shaft passing through cam bore 363, where a bore may comprise a though-hole formed in an element. In some embodiments, second frame 224 may further comprise a pitch control bore 364 configured to accommodate, e.g., a pitch control rod of the blade pitch control assembly.

B. Example TPS Gearbox Embodiments

Figure 4A:
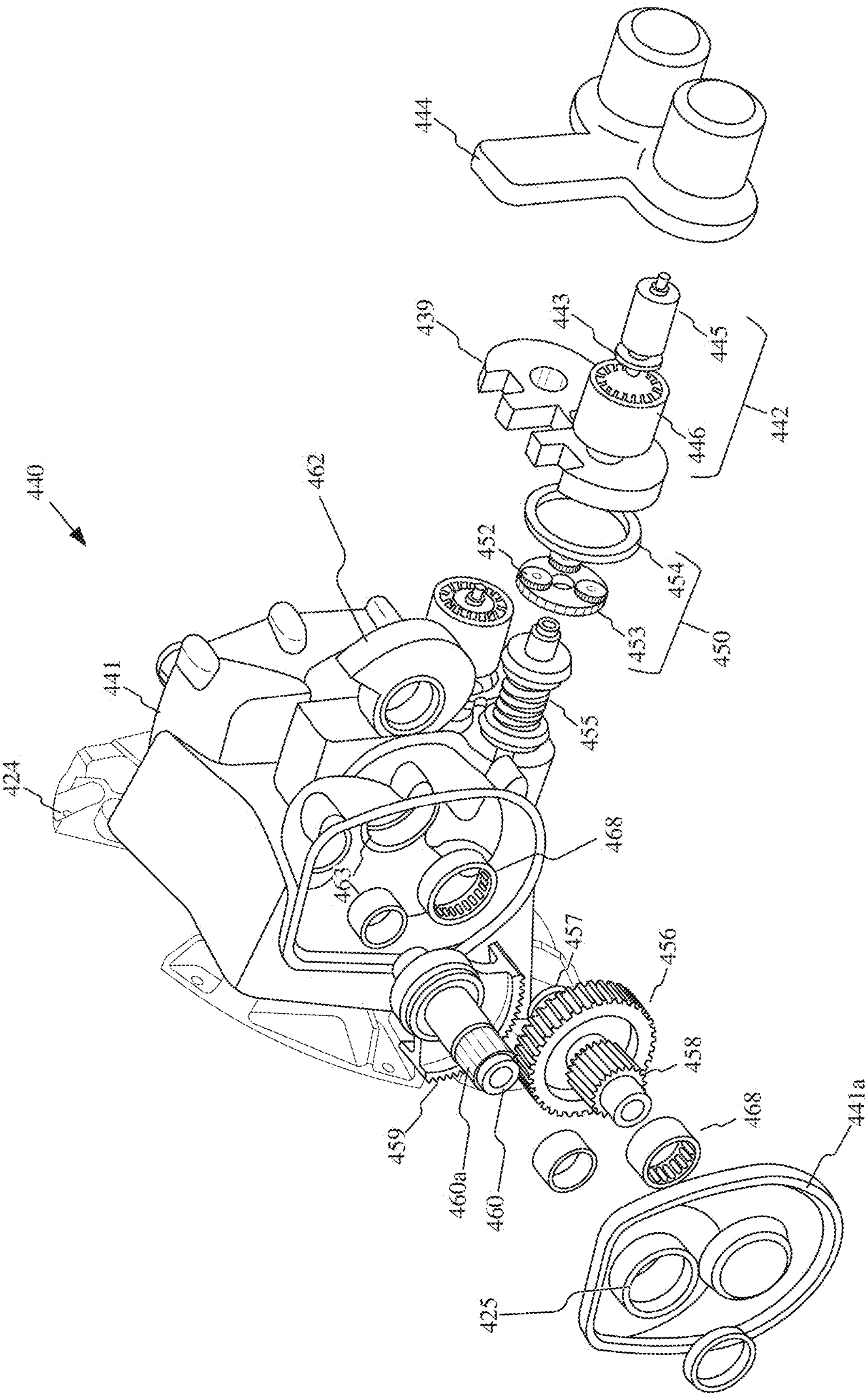
FIGS. 4A-4D illustrate example tilt actuation assemblies, consistent with embodiments of the present disclosure.
Figure 4B:
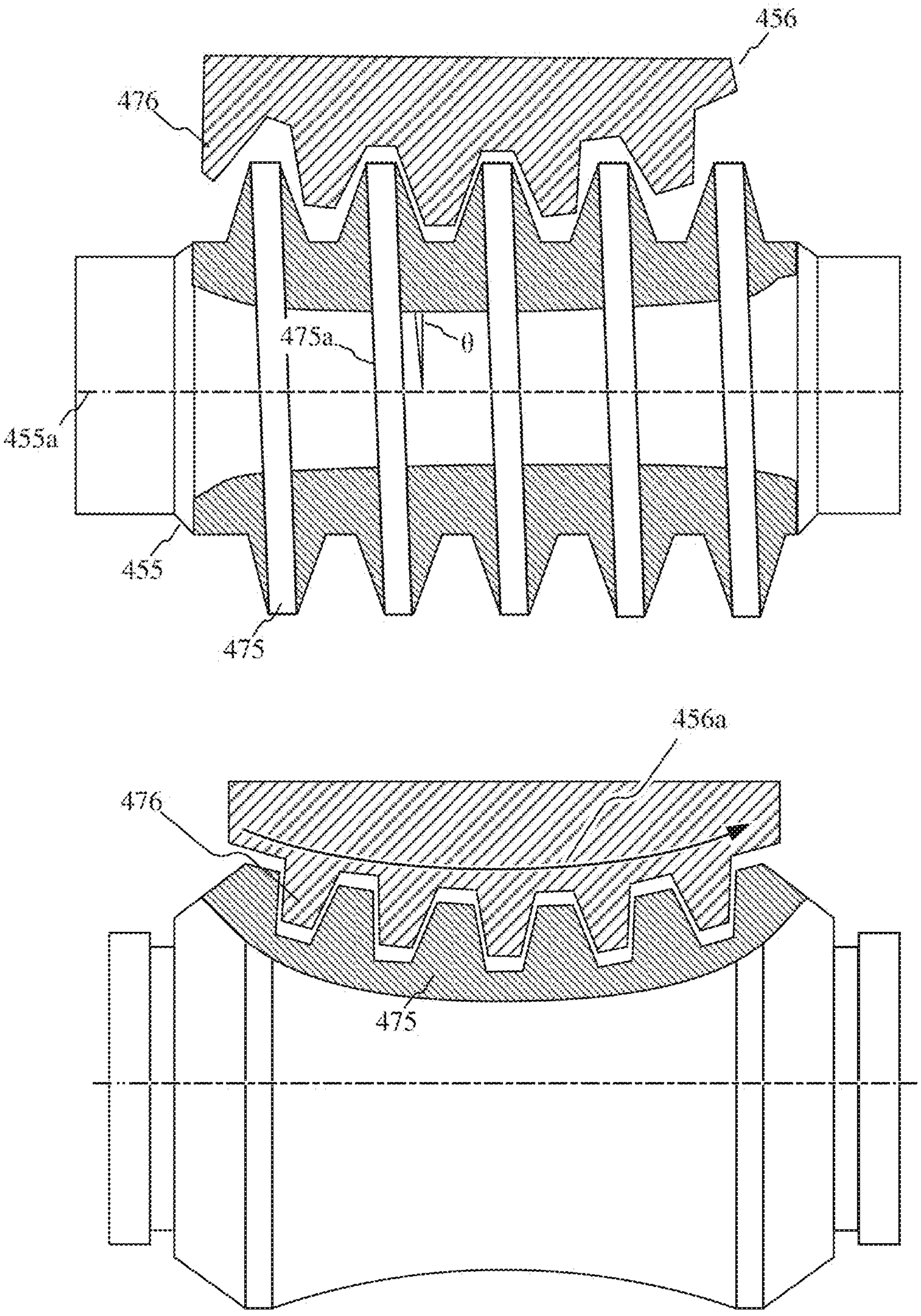
Figure 4C:
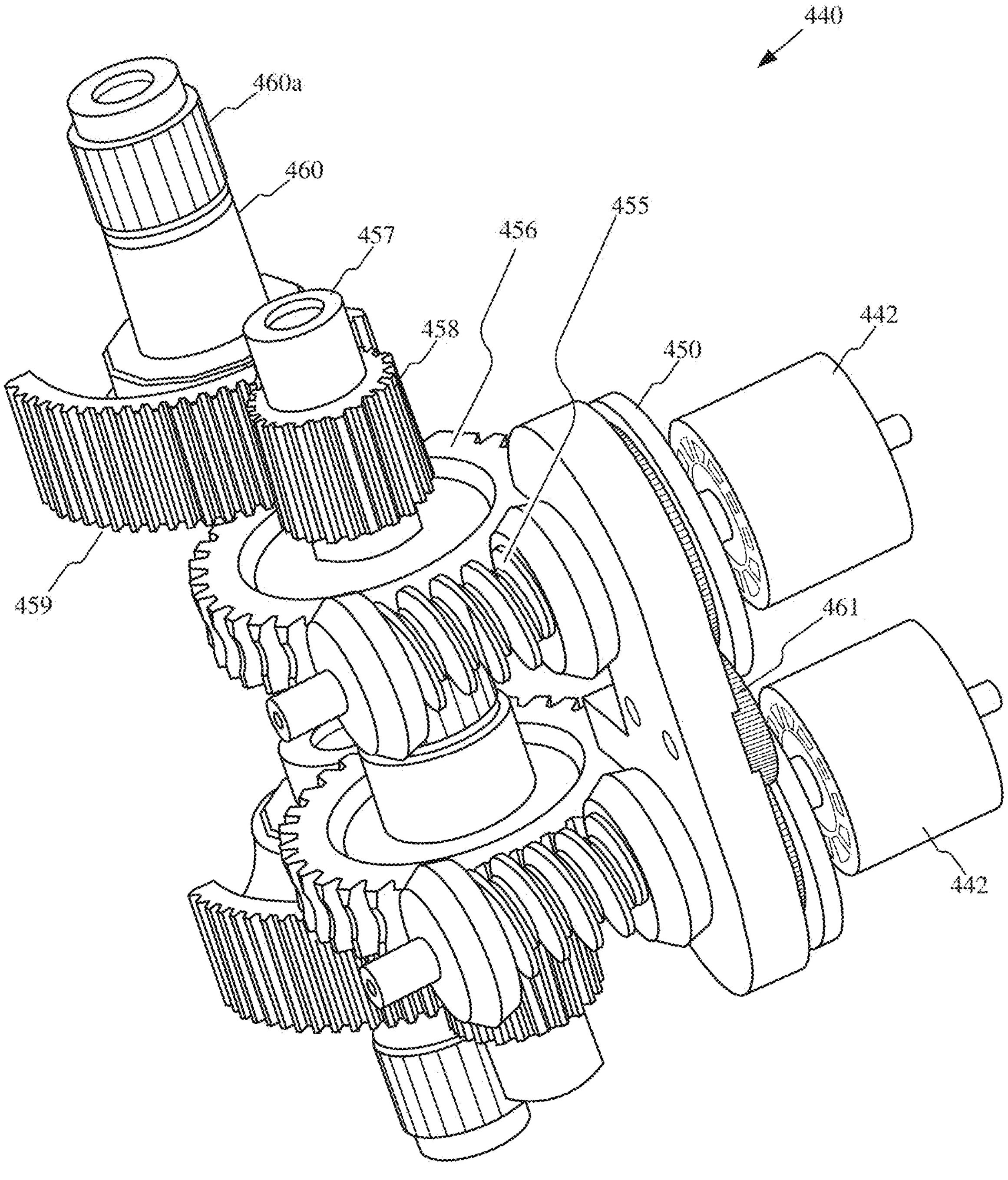
Figure 4D:
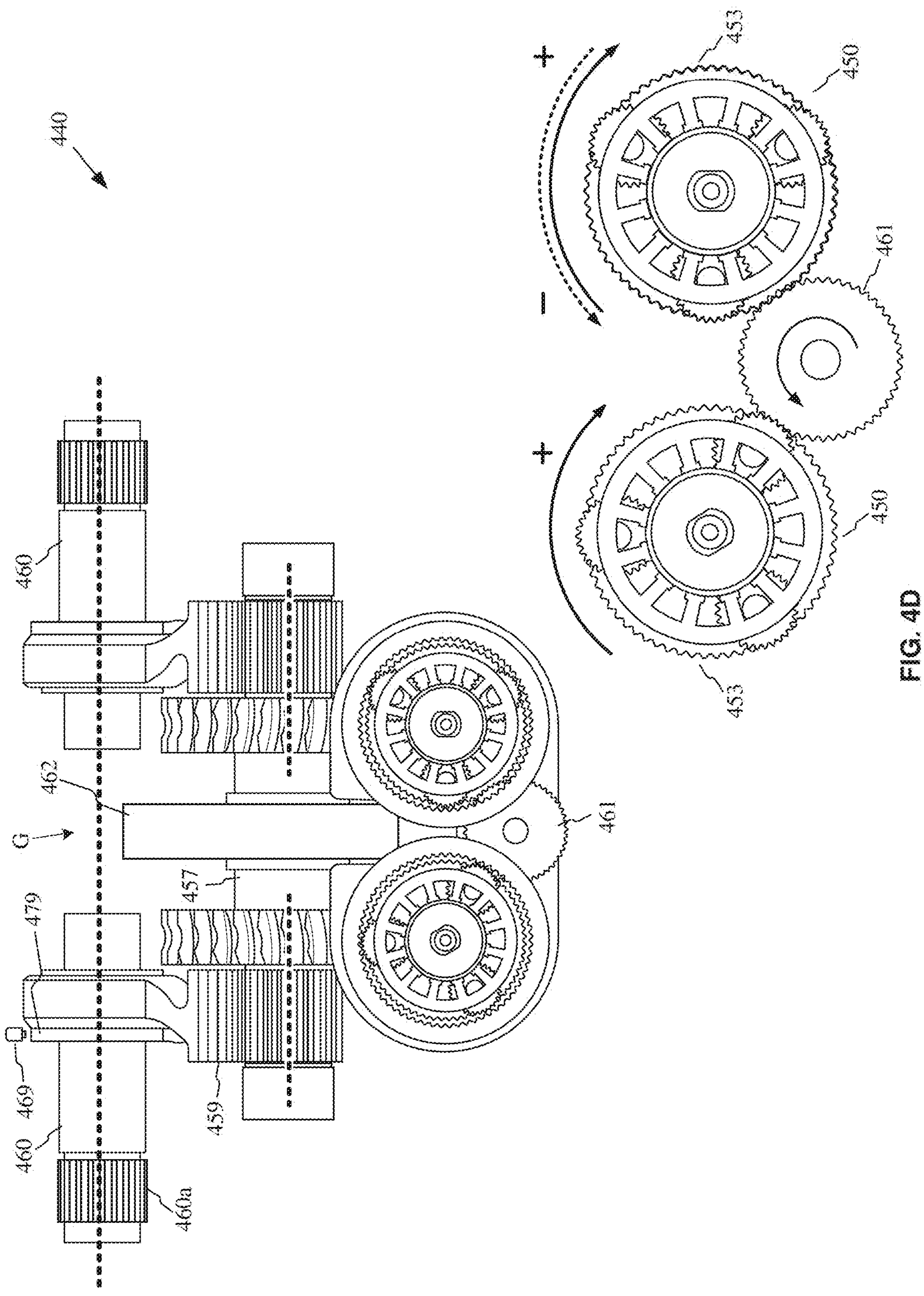

FIGS. 4A-4D illustrate example tilt actuation assemblies in an aircraft, such as VTOL aircraft 100, consistent with embodiments of the present disclosure. For example, FIG. 4A illustrates an exploded view of an example tilt actuation assembly 440. The exploded view illustrates only a first (left-side) torque path from a first actuator 442 through a first gear reduction system to a first pivot 425. The first gear reduction system may comprise the various gears and shafts, as well as bearings and structural supports, arranged along the first torque path between first actuator 442 and the first pivot 425 as further discussed below. Such gears, shafts, and other components may comprise: planetary gear set 450, worm gear 455; worm wheel 456, gear shaft 457; pinion 458; bearings 468; sector gear 459; and output shaft 460. The gear reduction systems discussed herein may alternatively be referred to as a tilt actuator gearbox. Further, while only the first (left-side) torque path is shown, it should be understood that a symmetric and opposite second (right-side) torque path may comprise similar components, and may be adequately represented by the description of the elements in the exploded view of FIG. 4A. For example, providing multiple actuators along multiple torque paths may provide redundancy in the event of a failure of an actuator, gear, or other component Additionally, the arrangement. Additionally, it help to evenly distribute the torque to multiple pivots 425 on a first frame, or allow for smaller-sized actuators to be employed. In some embodiments, as further discussed below with respect to FIG. 6, a tilt actuation assembly may comprise a single torque path from a single actuator. Magnified views of portions of the tilt actuation assembly 440 are shown at FIGS. 4B-4D.

Tilt actuation assembly 440 may comprise an actuator 442. Actuator 442 may comprise, e.g., a rotary actuator having a rotor 445 housed within a stator 446. For example, actuator 442 may comprise, e.g., an induction motor, other electric motor, or any other type of rotary actuator. In some embodiments, actuator 442 may comprise a linear actuator adapted to produce rotary motion using, e.g., a slider, lead screw, rack and pinion, or other mechanical system. In some embodiments, actuator 442 may comprise, e.g., a hydraulic or pneumatic motor. A rotor shaft of actuator 442 may be coupled to a gear, such as sun gear 443. Actuator 442 may be mounted to adjoining structures of the tilt actuation assembly 440 by, e.g., a mounting bracket 439, which may also support a second tilt actuator in some embodiments. An actuator cap 444 may be configured to cover actuator 442 to enclose it within tilt actuation housing 441.

Actuator 442 may be coupled to planetary gear set 450. For example, planetary gear set 450 may comprise a sun gear 443, a plurality of planetary gears 452, a planetary carrier 453, and a ring gear 454. As discussed above, a rotor shaft of actuator 442 may be coupled to sun gear 443 such that the rotor shaft extends from the tilt actuator 442 to the sun gear 443. Sun gear may be configured to mesh with the inner sides of the plurality of planetary gears 452 (i.e., the sides facing toward the center of planetary carrier 453) to rotate the plurality of planetary gears 452. The plurality of planetary gears 452 may in turn be coupled to planetary carrier 453 and be configured to mesh with ring gear 454 along their outer sides. Thus, when actuator 442 is energized, it may exert a torque through sun gear 443 as an input, through the plurality of planetary gears 452, and on to either planetary carrier 453 or ring gear 454 as an output. For example, as seen in FIG. 4A, the torque may be output at planetary carrier 453 to worm gear 455. Planetary gear set may comprise a first gear stage of the tilt actuation assembly 440. In some embodiments, the first gear stage may comprise a gear reduction ratio of approximately, e.g., between 2:1 and 5:1. In some embodiments, the first gear stage may comprise a gear reduction ratio of, e.g., between 3:1 and 4:1. It is to be understood that these gear ratios are exemplary and nonlimiting and other gear ratios may be used in the first gear stage.

Worm gear 455 may be concentrically coupled to the output of planetary gear set 450, such as at planetary carrier 453. Worm wheel 456 may be configured to mesh with worm gear 455. Worm wheel 456 may be concentrically coupled to, e.g., gear shaft 457, such that when actuator 442 is energized, worm gear 455 may turn worm wheel 456 and gear shaft 457, thereby transferring a torque about an axis of actuator 442 into a perpendicular torque about an axis of gear shaft 457. Worm gear 455, worm wheel 456 and gear shaft 457 may comprise a second gear stage of the tilt actuation assembly 440. In some embodiments, the second gear stage may comprise a gear reduction ratio of approximately, e.g., between 20:1 and 40:1. In some embodiments, the second gear stage may comprise a gear reduction ratio of, e.g., between 28:1 and 35:1. It is to be understood that these gear ratios are exemplary and nonlimiting and other gear ratios may be used in the second gear stage.

The worm gear configuration of the second gear stage may provide a number of advantages. For example, as noted above, the worm gear/worm wheel arrangement may offer a high reduction ratio in a compact space. The reduction ratio may be based on the number of teeth 476 of worm wheel 456 divided by the number of independent screw-like threads 475, or starts, on worm gear 455. For example, as seen at FIG. 4B, a worm gear 455 may comprise a single thread 475 that wraps continuously around worm gear 455. Each full turn of worm gear 455 may move worm wheel 456 by one tooth 476. Therefore, a 40-tooth worm wheel and a single-thread worm gear may achieve a high gear reduction of 40:1 in a small space.

Further, a worm gear may be configured with a self-locking feature to prevent backdriving. Backdriving may occur when, e.g., a downstream gear that is farther away from an actuator along a torque path drives an upstream gear that is nearer to the actuator. For example, backdriving may refer to worm wheel 456 driving worm gear 455 instead of the other way around, as a result of forces being exerted upon worm wheel 456. For example, ignoring any self-locking features, the weight of the motor assembly and propeller may backdrive a worm gear 455 toward a cruise configuration. Alternatively, the thrust of a spinning propeller may backdrive worm gear 455 toward either a lift or cruise configuration, depending on the relationship between the thrust line of the propeller and the hinge line about which the propeller tilts. For example, viewing FIG. 2A, the thrust line may represent the direction of thrust of the propeller 214. For the purposes of this description, the thrust line may be considered as substantially coincident with the propeller rotation axis 292. When the thrust line 292 is offset from a hinge line extending out of the page through pivot 225, the propeller thrust may generate a moment about the hinge line to exert a torque at pivot 225. Therefore, when the thrust line 292 is located below the pivot 225 when viewed in the cruise configuration, the torque about pivot 225 may backdrive a worm gear to tilt the propeller 214 up towards a lift configuration. If the thrust line 292 is located above the pivot 225 when viewed in the cruise configuration, the opposite may occur. A torque about pivot 225 may backdrive the worm gear to tilt the propeller 214 down towards a cruise configuration.

Backdriving may be prevented, reduced, or controlled, by appropriate design of the worm gear 455 and thrust line 292. For example, the tilt apparatus may be designed such that thrust line 292 is offset from pivot 225 by a predetermined threshold and direction. This may generate a moment about the pivot 225 when thrust is generated. In some embodiments, a thrust 292 line may pass substantially through pivot 225 to minimize propeller-induced backdriving. This may help to prevent a runaway tilting in the event of an actuator failure, or it may help to maintain a degree of control by reducing the load requirements on remaining actuators. In some embodiments, thrust line 292 may pass below or above pivot 225 so that thrust will bias the tilt propeller toward a lift or cruise configuration, respectively. For example, in some embodiments (as shown in FIG. 2A) the thrust line 292 may run below pivot 225 to bias the tilt propeller 214 slightly toward a lift configuration by its own propulsion. The lift configuration may be considered a safer mode than a cruise configuration for emergency flight situations, or it may be the most preferable arrangement when design constraints prevent a thrust line from passing directly through the pivot 225. In some embodiments, it may be desired to bias the tilt propeller 214 slightly toward a cruise configuration, e.g., to enable conventional flight in the event of an actuator failure, which may allow for greater energy efficiency and more flight time.

Additionally, returning to FIG. 4B, an appropriate lead angle θ may be chosen for the threads of worm gear 455 to control backdriving. The lead angle θ may refer to an angle made by the slanted spiral faces 475*a* of threads 475, as measured from a plane perpendicular to an axis of rotation 455*a* of worm gear 455. When this lead angle is made small (such that, e.g., the threads are nearly perpendicular to their axis of rotation), the frictional forces between worm gear 455 and worm wheel 456 may be too great to allow backdriving by the worm wheel 456. However, because the worm gear's threads 475 are able to slide against teeth 476, the worm gear 455 may be able to overcome the sliding frictional forces to drive worm wheel 456 by actuator 442. This self-locking feature may be useful to allow a tilt propeller to be driven to any desired tilt angle, and held there, without requiring an excessive amount of energy to do so. It may also be useful in the event of a failure of actuator 442, because the self-locking may reduce or eliminate rapid changes in tilt angle that may cause damage or loss of control in the tilt propeller. In some embodiments, as further discussed below, the sizing of actuator 442 and the design of worm gear 455 may be chosen to achieve desired operational specifications at a minimal weight penalty. In some embodiments, worm gear 455 may comprise a globoid gear as seen at the bottom of FIG. 4B. In the globoid configuration, the threads 475 may conform to the arc 456*a* of worm wheel 456 to more closely mesh with teeth 476, leading to higher power transfer and reduced backlash.

Returning to FIG. 4A, gear shaft 457 may further be concentrically coupled to pinion 458. In some embodiments, pinion 458 may comprise, e.g., a helical gear or a spur gear. A further end of gear shaft may be received in, e.g., a side panel 441*a* of tilt actuation housing 441 via a rotary bearing 468. Rotary bearing may comprise, e.g., ball bearings, cylindrical roller bearings, needle roller bearings, or other rotary bearings. Pinion 458 may be configured to mesh with sector gear 459. In some embodiments, sector gear 459 may comprise, e.g., a spur gear or a helical gear. Sector gear 459 may be concentrically coupled to output shaft 460 which may be fixed to the first frame (not shown) at pivot 425. For example, output shaft may comprise a splined section 460*a* to fix it to the first frame. Output shaft 460 may be rotatably coupled to the second frame 424 via, e.g., tilt actuation housing 441. Therefore, sector gear 459 and output shaft 460 may remain stationary with respect to the first frame, while the second frame may be able to rotate about the output shaft 460 and pivot 425. The necessary torque for achieving this rotation may be provided at the interface between pinion 458 and sector gear 459. For example, as gear shaft 457 is driven by actuator 442 through the first and second gear stages, movable pinion 458 may roll along the teeth of stationary sector gear 459 to tilt the entire tilt actuation assembly 440, second frame 424, motor assembly and propeller (not shown). Thus, a tilt actuation assembly 440 may be mounted entirely on second frame 424 and be configured to tilt second frame 424 with respect to a first frame. Further, sector gear 459 may limit the tilt range of second frame 424 to prevent a propeller blade from colliding with a surface of VTOL aircraft 100. For example, sector gear 459 may set a maximum tilt angle of the tilt actuation apparatus to maintain a clearance CL (see, e.g., FIG. 2A) between the VTOL aircraft 100 and a propeller of the propulsion system.

as seen in FIG. 4A, pinion 458 and sector gear 459 may comprise a third gear stage of the tilt actuation assembly 440. In some embodiments, the third gear stage may comprise a gear reduction ratio of approximately, e.g., between 2:1 and 5:1. In some embodiments, the third gear stage may comprise a gear reduction ratio of, e.g., between 3:1 and 4:1. It is to be understood that these gear ratios are exemplary and nonlimiting and other gear ratios may be used in the second gear stage. In some embodiments, the first, second and third stages may have a combined gear reduction of, e.g., between 250:1 and 500:1, although other combined gear ratios are also contemplated. This may allow relatively small actuators to be employed, reducing the overall mass of the tilt actuation assembly 440 and VTOL aircraft 400, and increasing energy efficiency.

In some embodiments, a tilt actuation assembly 440 may comprise a cam 462 (see e.g., FIG. 4A). For example, cam 462 may concentrically coupled to gear shaft 457 via, e.g., a cam bore 463 in second frame 424 (similar to cam bore 363 in FIG. 3). In this way, cam 462 may rotate by an angle that may be in a fixed relationship with the tilt angle of the tilt propeller. This relationship may be used to, e.g., adjust a propeller blade pitch as a function of tilt angle. For example, the cam 462 may be designed with an outer profile that acts on a pitch control rod (not shown) as the cam turns. A shape of the outer profile of cam 462 may be chosen so that it moves the pitch control rod a desired amount for a given tilt angle of the propeller, as further discussed below. Alternatively or additionally, the cam profile may be used to, e.g., measure the propeller tilt angle as discussed below.

FIG. 4C illustrates example components of the first, second and third gear stages of tilt actuation assembly 440 in an assembled state, consistent with embodiments of the present disclosure. The view in FIG. 4C may more clearly illustrate the interfaces between various gears in tilt actuation assembly 440. For example, as seen in FIG. 4C, actuator 442 may be concentrically aligned with an input and output of planetary gear set 450, which may in turn be concentrically aligned with worm gear 455. The rotation of worm gear 455 about an actuator axis may turn worm wheel 456 along a rotation axis of gear shaft 456 that may be generally perpendicular to the actuator axis. Gear shaft 456 may turn pinion 458 such that pinion 458 may roll along the teeth of sector gear 459, while sector gear 459 remains stationary with respect to a first frame (not shown). For example, sector gear 459 may be concentrically coupled with output shaft 460, which may be fixed at the first frame by a splined section 460*a*. Thus, all illustrated elements along a torque path between actuator 442 and pinion 458 may rotate about output shaft 460 by one or more actuators 442.

Additionally, FIG. 4C may illustrate the dual torque paths that may be achieved, consistent with embodiments of the present disclosure. For example, first and second actuators 442 may each turn their own planetary gear sets 450, worm wheels 455, etc., along two parallel torque paths. In some embodiments, the torque paths may be coupled by an idler gear 461 as discussed below.

FIG. 4D illustrates a further view of tilt actuation assembly 440, consistent with embodiments of the present disclosure. An idler gear 461 may couple first and second actuators 442 together via, e.g., the outputs of first and second planetary gear sets 450. For example, when planetary carriers 453 are configured as the outputs of the planetary gear sets 450, idler gear 461 may be configured to mesh with first and second planetary carriers 453. As seen at the bottom right of FIG. 4D, when the planetary carriers 453 are turned in the clockwise direction as indicated by solid arrows, idler gear is turned counter-clockwise in conformity with the planetary carriers 453. During normal operation of the tilt actuation assembly 440, idler gear may simply travel along with the two planetary gear sets 450, without transferring a substantially large load between the two torque paths. However, idler gear 461 may nevertheless perform a load-balancing function to even out any minute differences between the left and right-side torque paths. Further, if one actuator fails, the remaining actuator may be able to distribute its torque via idler gear 461 substantially evenly between the two torque paths to prevent excessive torsional loads or imbalances.

The degree to which a single actuator may be capable of driving the entire propulsion system may depend on the actuator sizing. For example, in some embodiments, two actuators may be sized to be fully redundant, in that either actuator may be capable of tilting the propulsion system at normal operating speed for an extended period. However, such a system may come with high cost and excessive weight, which may reduce the flight range of the VTOL aircraft or necessitate the removal of other important features. Additionally, specifications or flight standards may not call for such full redundancy. In some embodiments, actuators 442 may be sized such that a single actuator 442 may be capable of tilting the propulsion system at a reduced rate of speed.

In some embodiments, the actuators 442 may be sized such that a single actuator 442 is capable of maintaining stability of the tilt propulsion system, alternatively to or in combination with worm gear 455. For example, if one actuator fails, another actuator may be capable of backdriving the torque path of the failed actuator even when it is not sized to support the entire load of the tilt actuation apparatus. Such a configuration may advantageously reduce weight in the VTOL aircraft while maintaining a safe flight mode. For example, this configuration may still allow a propulsion system to be held stable, or even to be actuated out of cruise configuration to a safer lift configuration despite the single actuator being suboptimal for performing this actuation unassisted by other sources of tilting torque, such as the propulsion system. In some embodiments, for example, a lift propeller may be driven so as to provide additional lifting power to assist the remaining actuator 442 in tilting the propulsion system to a safer tilt angle. This may be made possible by appropriate design of the thrust line and pivot as discussed above. Alternatively, the functioning actuator may apply a torque against idler gear 461 and rely on flight-induced vibrations to urge the gear along. This may achieve a suitable amount of backdriving during a failure mode without adding excessive weight to the aircraft.

Additionally, under normal conditions when both actuators are operational, greater stability may be achieved by forcing the two actuators against each other. For example, when a left-side planetary carrier 453 is actuated in the positive direction as indicated by solid arrows, the right-side planetary carrier 453 may be actuated in the negative direction as indicated by the dashed arrow. A first torque in the positive direction and a second torque in the negative direction may be substantially equal and opposite. The conflicting forces may achieve a high level of stability with low expenditure of energy, particularly when used in combination with the self-locking features of worm gear 455.

Additionally, as shown in FIG. 4D, a tilt actuation assembly 440 may comprise a tilt sensor 469 configured to sense the tilt angle of the propulsion system. In some embodiments, an otherwise unexploited surface of tilt actuation assembly 440 may be configured for sensing the tilt angle in combination with tilt sensor 469. For example, a back side surface 479 of sector gear 459 may be formed with a predetermined cam profile. Tilt sensor 469 may comprise a proximity sensor configure to sense a proximity to back side surface 479. In this way, a gap distance between tilt sensor 469 and back side surface 479 may vary according to a known relationship with the tilt angle. In some embodiments, other sensor configurations may be used. For example, another surface may be used instead of back side surface 479 of sector gear 459, so long as the surface can be configured to change in a known relationship to the tilt angle. Further, back side surface 479 may be configured other than as a cam profile. For example, back side surface 479 may configured with gratings or other indicia, and tilt sensor 469 may comprise, e.g., an optical encoder. Alternatively, a resolver or other angular sensor may be arranged at back side surface 479. It is also contemplated that other types of tilt sensors that do not rely on a gap measurement may be used to determine the tilt angle.

As further illustrated in FIG. 4D, shafts in tilt actuation assembly may be continuous, or they may be divided between the left and right torque paths. For example, an output shaft 460 may comprise independent segments as illustrated (segments 460 on either side of central gap G), or may comprise a single shaft 460 as indicated by the long dashed line. Similarly, gear shaft 457 may be continuous as illustrated, or may comprise independent segments as indicated by the short, dashed lines. A continuous shaft may be preferable for added stability and distribution of torque, but independent segments may be preferable to reduce weight or create space to accommodate other components. In some embodiments, a continuous gear shaft 457 may be preferable when mounting a cam 462 as discussed below.

Figure 5A:
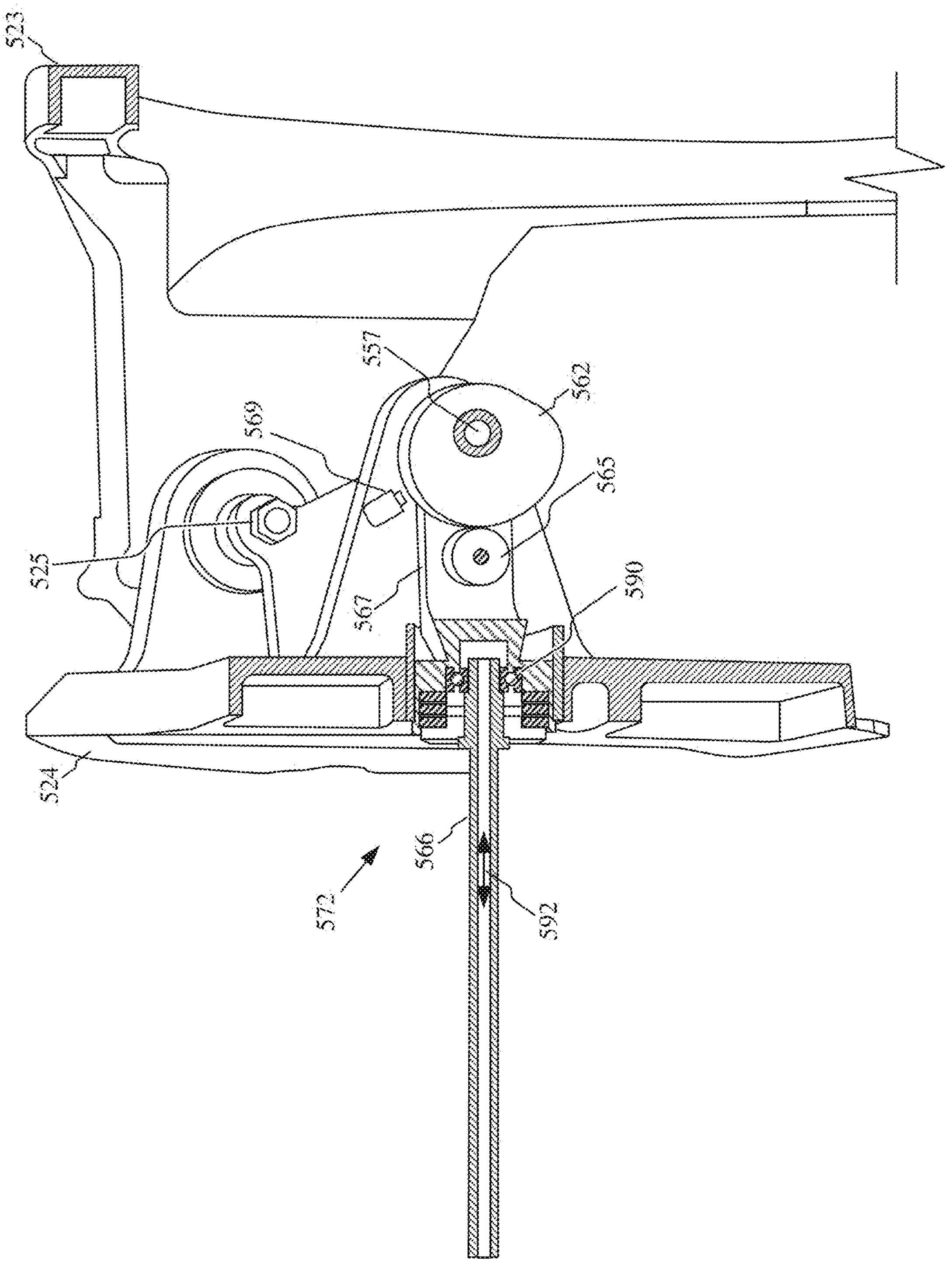
FIGS. 5A-5C illustrate an example blade pitch control assembly, consistent with embodiments of the present disclosure.
Figure 5B:
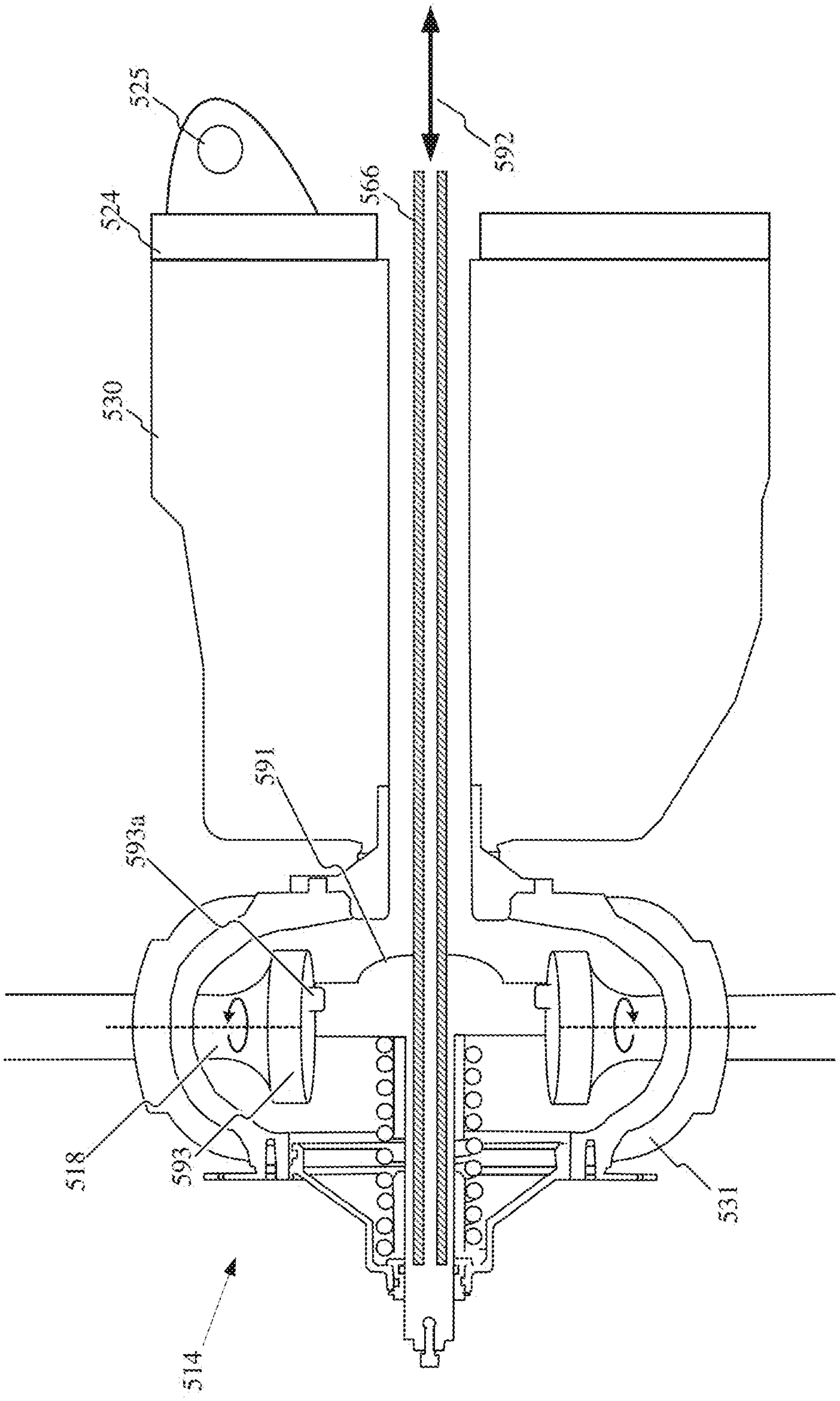
Figure 5C:
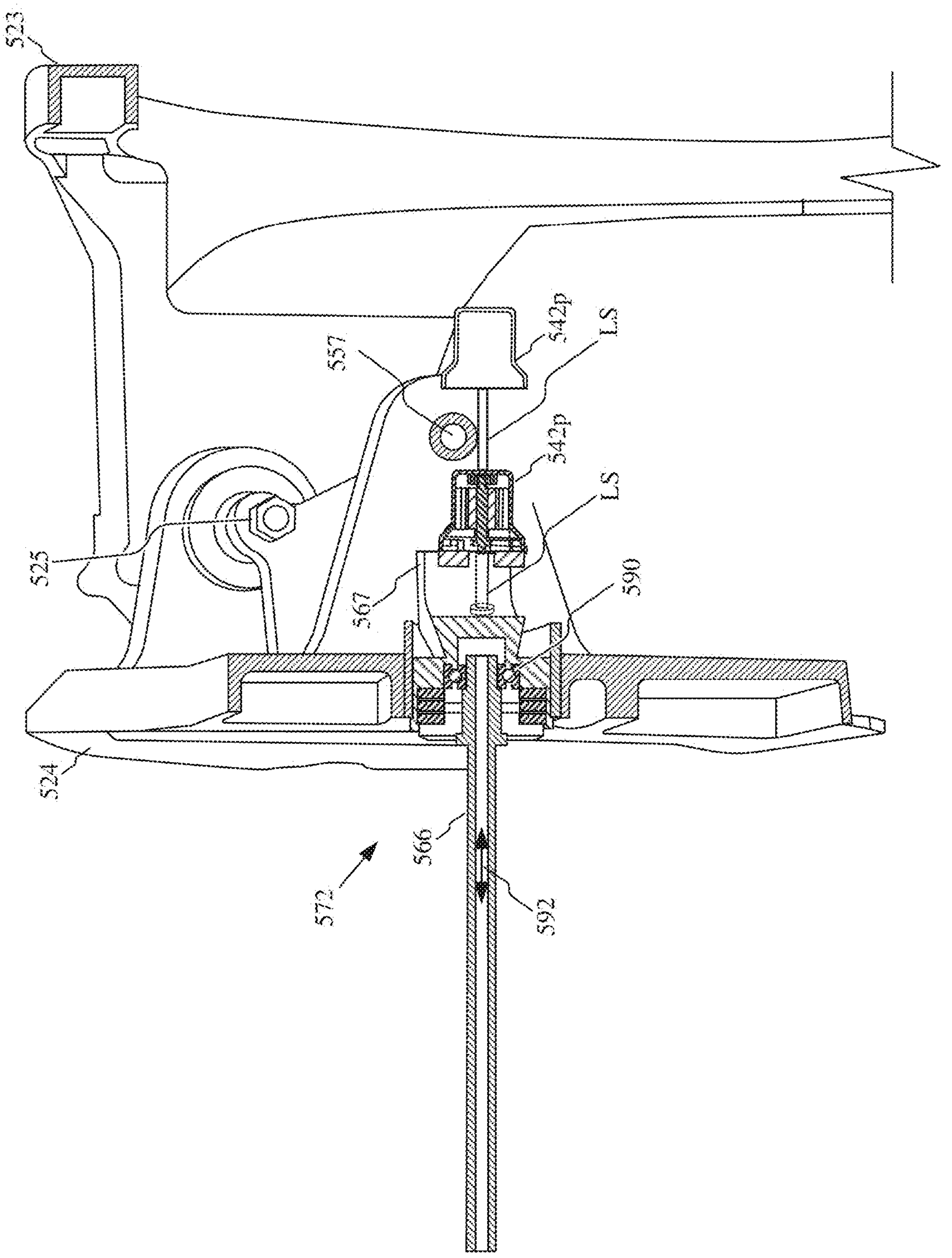

FIGS. 5A-5C illustrate example blade pitch control assemblies 572 in an aircraft, such as VTOL aircraft 100, consistent with embodiments of the present disclosure. Blade pitch control assembly 572 may be integrated with, e.g., a tilt actuation assembly as discussed above. Cam 562 and gear shaft 557 may correspond to, e.g., cam 462 and gear shaft 457 of FIGS. 4A-4D. In VTOL aircraft 100, it may be desirable to achieve a low blade pitch angle in the lift configuration for optimal thrust, and a high blade pitch angle for optimal efficiency in cruise. As discussed previously and shown in FIG. 5A, cam 562 may be turned along with the tilting of second frame 524 about pivot 525. An outer profile of cam 562 may press against a roller 565 that is coupled to a slider 567, which in turn may move the pitch control rod 566 along a propeller rotation axis 592. Pitch control rod 566 may further be rotationally decoupled from slider 567 by pitch control rod bearing 590 to allow pitch control rod 566 to spin about its axis along with propeller 514. By selecting an appropriate profile shape of cam 562, pitch control rod 566 may be actuated to control the blade pitch angle as a function of propeller tilt angle.

For example, as shown in FIG. 5B, pitch control rod 566 may pass through second frame 524 and motor assembly 530, and be coupled to a propeller yoke 591. Propeller yoke 591 may be moveably mounted inside hub 531 such that it may move along the propeller rotation axis 592. Propeller yoke 591 may be coupled to each propeller blade 518, such as by an eccentrically placed pin or projection 593*a* in a blade actuating cup 593. When the propeller yoke 591 is moved along the rotational axis 592 by pitch control rod 566, propeller blades 518 may be rotated about their longitudinal axes (as shown by the circular arrows and dashed lines) to alter the pitch angle of propeller blades 518. Thus the blade pitch angle may be mechanically correlated with a tilt angle of the second frame 524. This may enable a design tradeoff by exchanging a degree of freedom in the pitch control for reduced complexity, weight, and independent control architecture. For example, when a blade pitch angle is automatically adjusted as a function of the propeller tilt angle, there is no need to provide a dedicated system for adjusting the blade pitch. By eliminating the components associated with such control, possible sources of failure are eliminated as well. Further embodiments of such a linked tilt pitch system may be found in U.S. patent application Ser. No. 18/098,417 and U.S. patent application Ser. No. 18/478,980, which are incorporated by reference in their entireties for all purposes. Additionally, as seen in FIG. 5A, cam 562 may be utilized as a sensing surface for a tilt sensor 569, in the same manner as discussed above with respect to tilt sensor 469 of FIG. 4D.

FIG. 5C illustrates a further embodiment of a blade pitch control assembly 572, consistent with embodiments of the present disclosure. In the embodiment of FIG. 5C, a dedicated pitch control actuator 542*p* may be provided to actuate, e.g., a pitch control rod 566. For example, pitch control actuator 542*p* may comprise a rotary actuator having a lead screw LS configured to move slider 567. Pitch control actuator 542*p* may be configured such that lead screw LS does not interfere with gear shaft 557, for example by locating pitch control actuator 542*p* between gear shaft 557 and pitch control rod 566. Alternatively, lead screw LS may avoid interfering with gear shaft 557 by arranging the lead screw LS to pass over or under gear shaft 557 with respect to a vertical direction as viewed in the cruise configuration. For example, an alternative arrangement is further shown in FIG. 5C, in which pitch control actuator 542*p* is arranged on an opposite side of gear shaft 557 from slider 567, such that lead screw LS passes under gear shaft 557. In some embodiments, pitch control actuator 542*p* may be accommodated by providing gear shaft 557 in two independent segments as discussed with respect to FIG. 4D, such that some part of pitch control actuator 542*p* may be arranged in a gap between the segments. In some embodiments, another type of actuator may be configured to impart linear motion to a pitch control rod 566.

Figure 6:
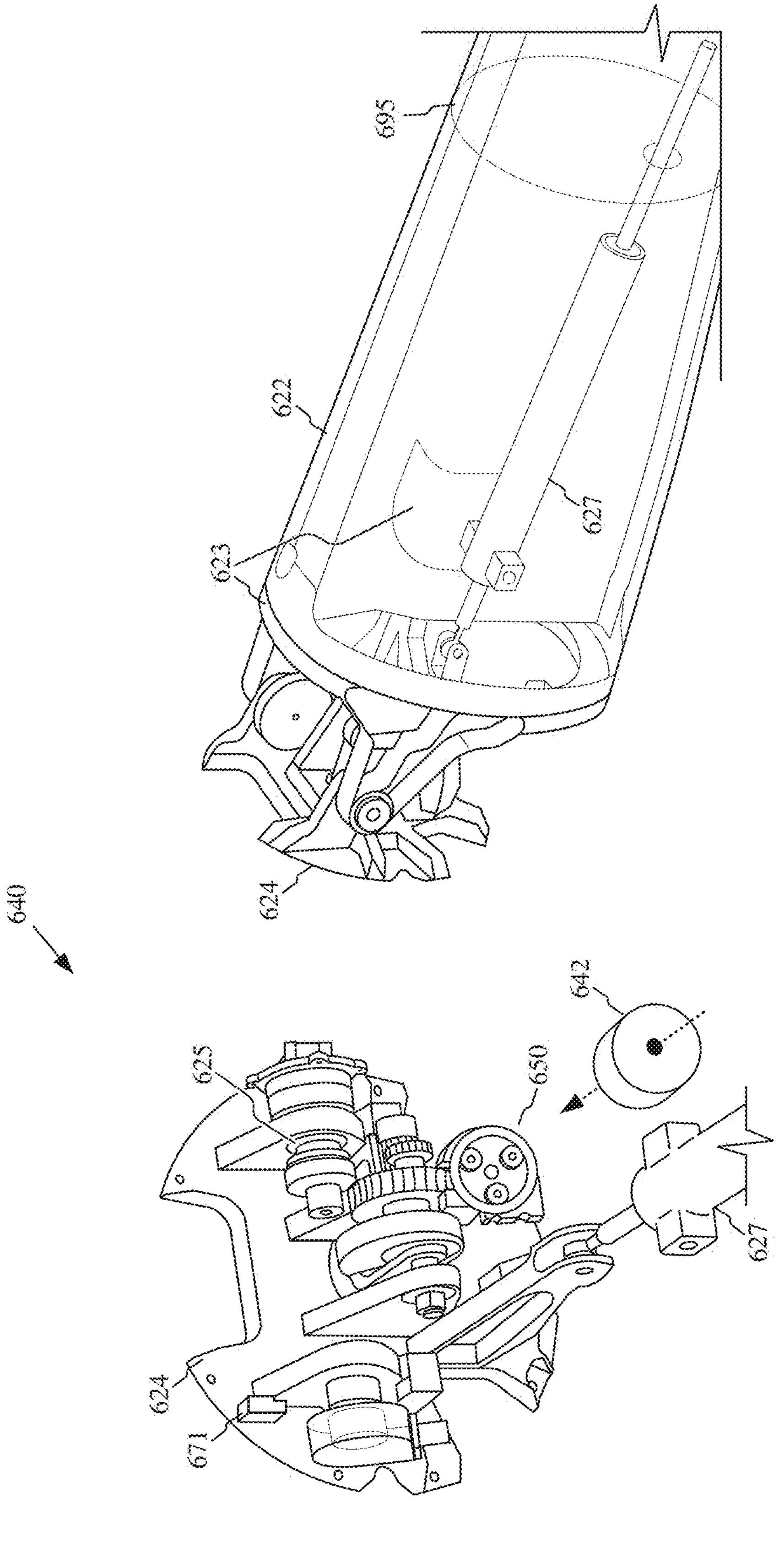
FIG. 6 illustrates an example tilt actuation assembly, consistent with embodiments of the present disclosure.

FIG. 6 illustrates an example tilt actuation assembly in an aircraft, such as VTOL aircraft 100, consistent with embodiments of the present disclosure. In FIG. 6, a single actuator 442 (see e.g., FIG. 4A) may be configured to tilt the second frame 624 along a single torque path to pivot 625. The single torque path may correspond to, e.g., one side of the dual torque paths discussed above, but may be sized appropriately to function on its own. In some embodiments, a single actuator 442 may be configured to tilt the second frame 624 along dual torque paths connected by an idler gear (see e.g., FIG. 4C). When only one actuator is present in a dual torque path configuration (such as, e.g., being coupled to the left side planetary gear set 450 of FIG. 4D), a full second planetary gear set may not be required because it is not needed to provide a gear reduction from a second actuator. For example, planetary carrier 453 or idler gear 461 may instead comprise a secondary load path gear configured to transfer torque to the second torque path.

Returning to FIG. 6, while the single actuation system may lack the redundancy of the dual torque paths, other safety or backup features may be provided while reducing the weight and cost of tilt actuation assembly 640. For example, a linear damper 627 may be provided to reduce the tilt rate of second frame 624 in the event of a failure of actuator 642. Linear damper 627 may be coupled between second frame 624 and another frame such as, e.g., first frame 623 or another structural element of VTOL aircraft 600. In some embodiments, linear damper may be further supported by a bulkhead 695, such as bulkhead 295 of FIG. 2B.

In the event that actuator 642 becomes disconnected from the second frame 624 or otherwise fails, damper 627 may dissipate energy, thereby limiting a rate of change in the tilt of second frame 624 and preventing catastrophic failures.

Damper 627 may comprise known damper configurations such as a balanced hydraulic or pneumatic cylinder, for example comprising a piston configured to slide within a cylinder, the piston including a plurality of apertures through which fluid may flows as the piston moves within the cylinder. Damper 627 may comprise a passive damper configured to apply a force (a hydraulic or pneumatic force) to the second frame 624 only when the tilt angle of the propeller (not shown) is changing (i.e., no bias is applied when the propeller is at rest). In some embodiments, additional redundant actuators 642 may be provided as well as a damper mechanism such as damper 627. Damper 627 may be configured to limit the rate of change of the tilt angle of the second frame 624 in both upward and downward tilt directions. Damper 627 may be positioned such that a force vector of the damper 627 can extend beneath a tilt axis of the propeller, such the tilt axis of pivot 625. In some embodiments, damper 627 may be configured to limit the rate of change of the tilt angle of the propeller to a below predetermined threshold value in the event that the actuator 642 becomes disconnected from second frame 624 or otherwise fails.

Further aspects of a linear damper are described in the above-incorporated U.S. patent application Ser. No. 18/098,417. Further, while not easily shown in other figures, a second frame 624 may comprise a hard stop 671 configured to prevent tilt propeller blades from colliding with a surface of VTOL aircraft 100, such as boom 622. For example, hard stop 671 may set a maximum tilt angle of the tilt actuation apparatus to maintain a clearance CL between the boom 622 or another surface of the aircraft and a propeller of the propulsion system (see, e.g., FIG. 2A). While the ability of a hard stop to prevent collision may be limited in propulsion systems that may accelerate rapidly during a failure, other features according to embodiments of the present disclosure may slow the acceleration to such a point that hard stop 671 becomes effective. For example, a linear damper 627, or a self-locking worm gear as discussed above, may slow the accelerations enough that a propulsion system may be stropped by hard stop 671.

Figure 7A:
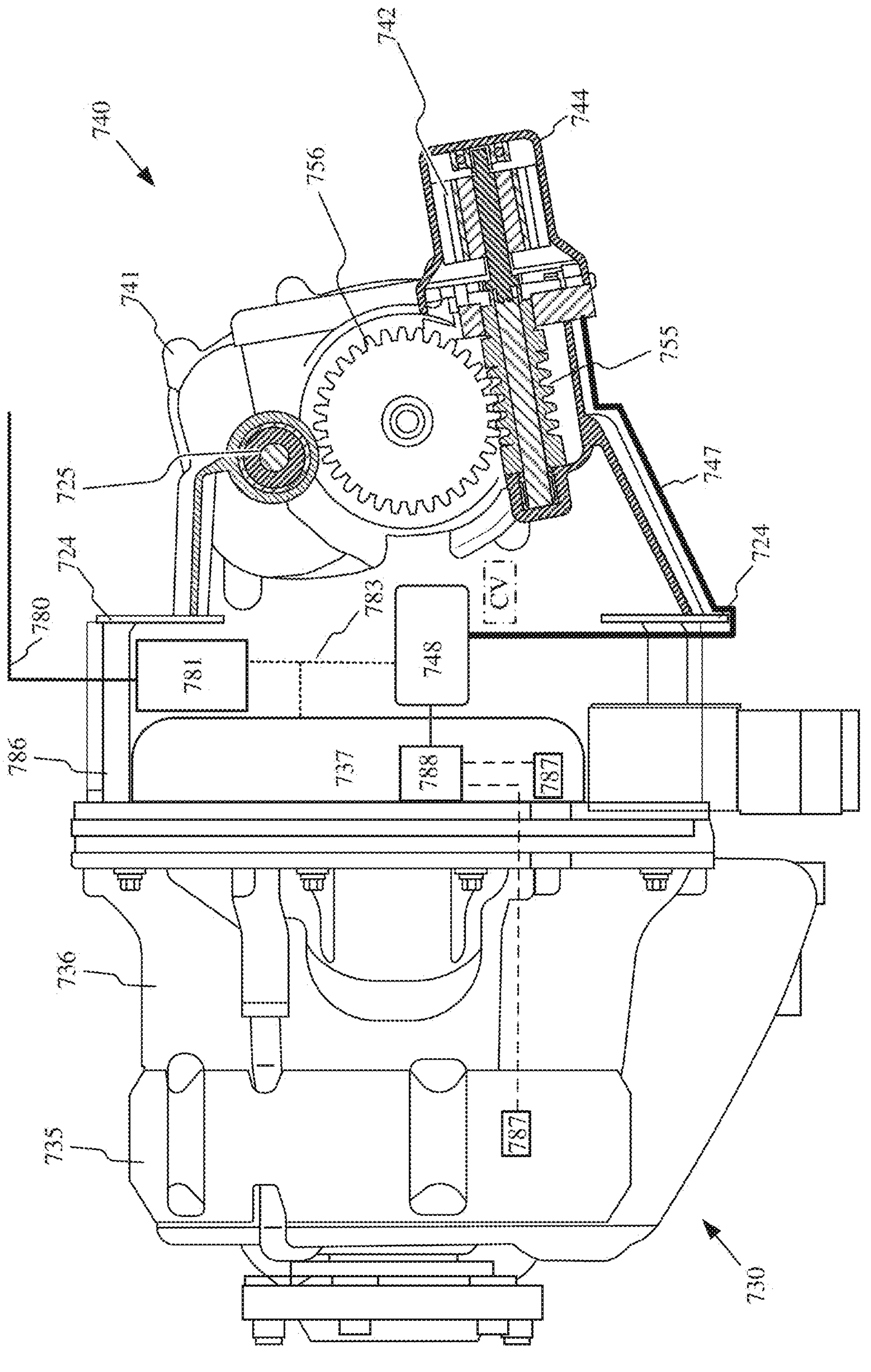
FIGS. 7A-7C illustrate example tilt actuation assemblies and motor assemblies, consistent with embodiments of the present disclosure.
Figure 7B:
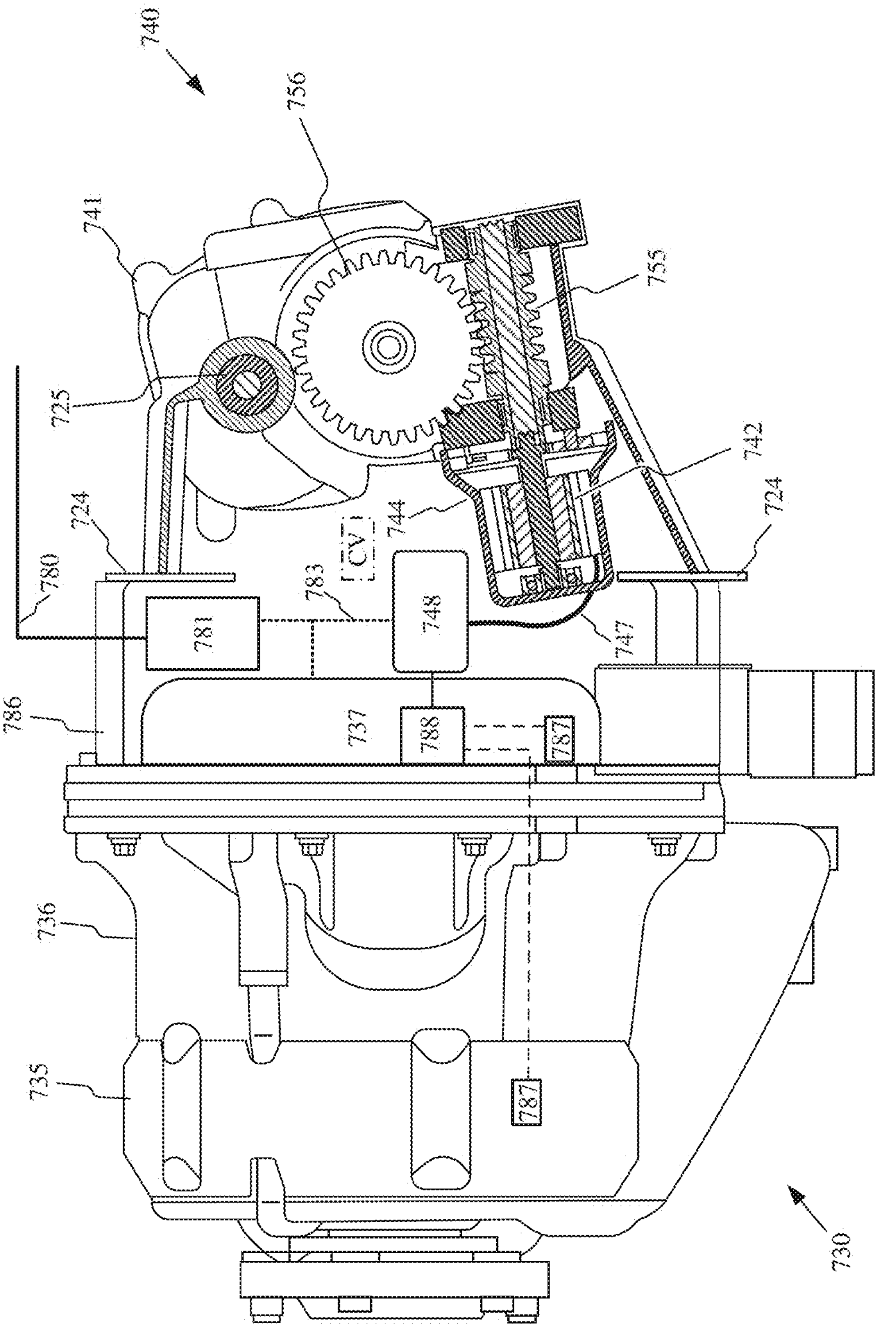
Figure 7C:
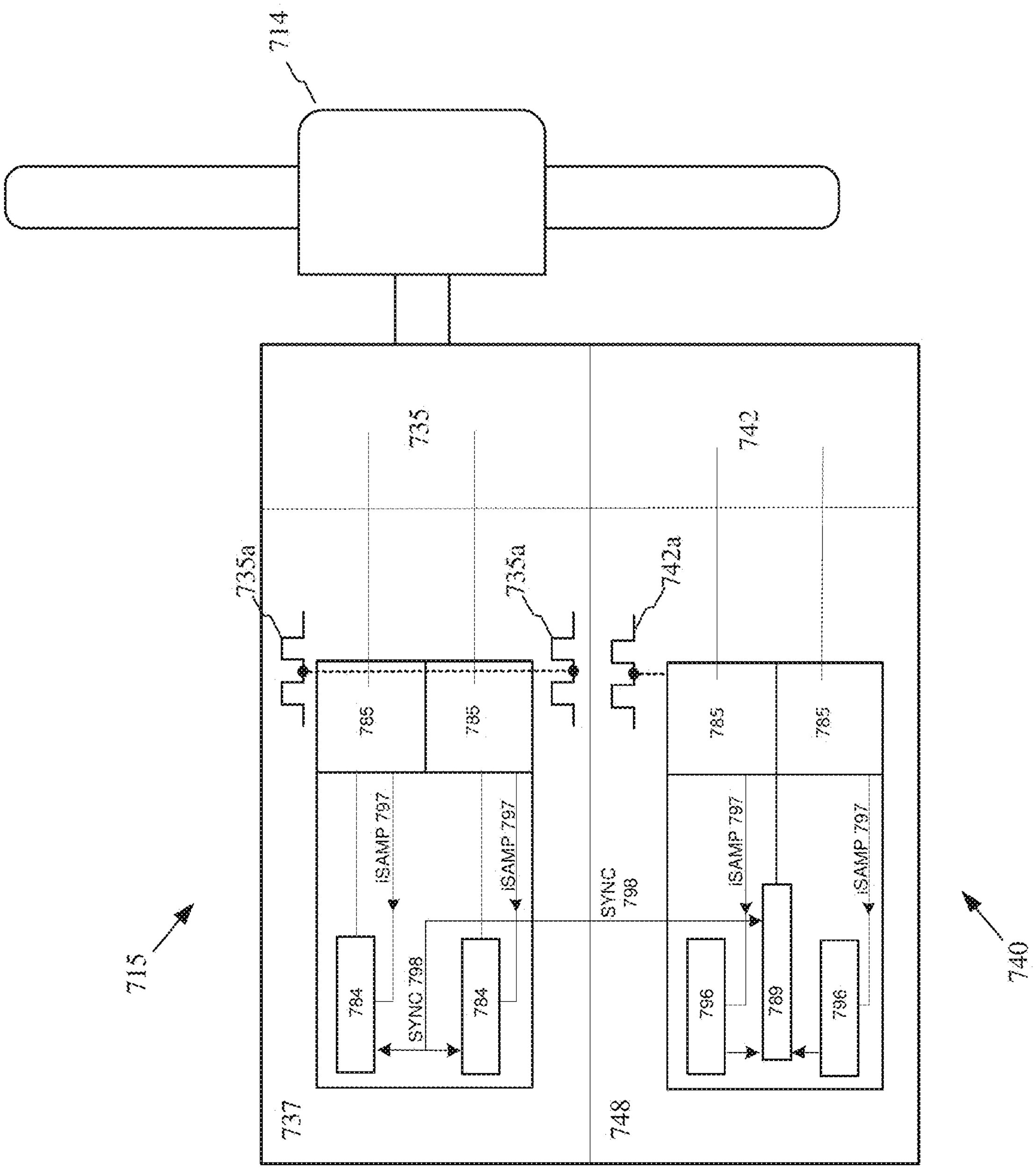

FIGS. 7A-7B illustrate example integrated tilt actuation assemblies 440 and motor assemblies 730 in a n aircraft, such as VTOL aircraft 100, consistent with embodiments of the present disclosure. Embodiments according to FIGS. 7A-7B illustrate various systems for co-packaging various elements of a tilt apparatus such as, e.g., a tilt actuation assembly 740 and a motor assembly 730, as well as for sharing resources such as inverter architecture and other electrical power and control systems.

In some embodiments, an inverter may receive high-voltage direct current (DC) power from a high voltage power system and may also receive torque commands from, e.g., an aircraft flight control system. An inverter may also receive low-voltage DC power from a low voltage system, for example a low voltage power system used to power engine control processors. In some embodiments, the low-voltage power may comprise, e.g., 28 volts. But this is merely an example, and other low voltages may be used. In some embodiments, an inverter may be responsible for: receiving aircraft torque commands and engine mode commands; generating AC currents within stator phase winding sets in order to output rotor torque; monitoring voltage, current, shaft speeds, torques, temperatures within the electrical engine; fault detection and accommodation; and/or transmitting status and faults to the aircraft.

A motor assembly 730 may comprise various modules such as, e.g., a motor 735, gearbox 736, and a propulsion inverter 737. For example, the modules may be arranged in the order shown or in another order. Propulsion inverter 737 may be configured to supply AC current to drive motor 735, and may be further configured to control motor 735 based on, e.g., commands from a flight control system of the VTOL aircraft, sensor feedback signals, etc. As illustrated in FIGS. 7A-7B, a propulsion inverter 737 may be mounted adjacent to a tilt actuation assembly 740 via second frame 724. In some embodiments, second frame 724 may comprise a central void CV so that an interior of tilt actuation housing 741 may be integrated with an inverter housing 786 of propulsion inverter 737 to create a common housing having a continuous volume in which electrical components may be co-packaged or shared. Therefore, in some embodiments the propulsion inverter 737 and components of tilt actuation assembly 740 may be contained within a common housing. For example, the tilt actuation inverter 748, tilt actuator wiring 747, tilt actuator 742, or various gears and shafts as discussed above may be contained in a common housing with propulsion inverter 737. of the However, embodiments of the present disclosure are not limited to this. For example, in some embodiments, one or more similar advantages to those discussed in this section may be achieved even when the propulsion inverter 737 is separated from actuator 742 or tilt actuation assembly 740 by, e.g., motor 735, gearbox 736, second frame 724, or a partition.

For example, power may be delivered from, e.g. one or more external battery packs of VTOL aircraft 700 as schematically illustrated by HV DC line 780 to an input and DC filter module 781. Input and DC filter module 781 may supply DC power to both propulsion inverter 737 as well as tilt actuation inverter 748, which may supply current to one or more actuators 742 via tilt actuator wiring 747. For example, tilt actuator wiring 747 may comprise a plurality of phase leads. In some embodiments, a plurality of tilt actuation inverters 748 may be provided for supplying current to a plurality of actuators 742. As illustrated in FIG. 7A, both propulsion inverter 737 and tilt actuation inverter 748 may be coupled to a common busbar 783 for supplying a common voltage to both systems from input and DC filter module 781. Propulsion inverter 737 and tilt actuation inverter 748 may further be configured to, e.g., share sensor information from various sensors 787, or share feedback controls or communication signals. Sensors 787 may comprises sensors for monitoring, e.g., electrical, mechanical, dynamic or thermal properties of motor assembly 730, a propeller (not shown) or other elements of a propulsion system. In some embodiments, propulsion inverter 737 may share sampling rates with tilt actuation inverter 748 for synchronization purposes. In some embodiments, propulsion inverter 737 may be configured to supply current to tilt actuator 742. In some embodiments, tilt actuation inverter 748 may comprise a subcomponent of, or otherwise be integrated with, propulsion inverter 737. In some embodiments, the integrated housing configuration may support internal coordination of thrust vectoring between propulsion inverter 737 and tilt actuation inverter 748. Additional embodiments of an integrated housing arrangement may include an integrated or shared controller 788. For example, controller 788 may comprise a shared controller configured to control both propulsion inverter 737 and tilt actuation inverter 748. Alternatively controller 788 may comprise an integrated tilt actuator controller within propulsion inverter 737 that is configured to control tilt actuation inverter 748. In some embodiments, tilt actuation inverter 748 may comprise a tilt actuator controller. In some embodiments, the integrated housing arrangement may allow for sharing a common circuit board among propulsion inverter 737 and tilt actuation inverter 748. This close arrangement or integration of control and power architectures for a propulsion system and tilt actuation assembly 740 may help to minimize the length, mass, and complexity of electrical connections, while reducing a total volume and mass of packaging structures.

In some embodiments, tilt actuator wiring 747 may be run, either externally or internally, through or along tilt actuation housing 741. Because actuator 742 may be co-packaged with its power supply and control components rather than leaving them fixed to a first frame, boom, or other stationary structure of VTOL aircraft 700, the tilt actuation inverter 748 and actuator 742 may remain in a fixed relationship through the full tilt range between lift and cruise configurations. Therefore the tilt actuation assembly 740 may be operated without the need for complex flexible cable or wiring arrangements. Additionally, the proximity of such components may reduce failure modes related to excess cabling, as well as saving production cost, weight, volume, and reducing electromagnetic emissions from cable leakage.

Furthermore as shown in FIG. 7B, in some embodiments actuator 742 may be arranged inside tilt actuation housing 741, such as between worm gear 755 and inverter 737. In such a case, tilt actuator wiring 747 may be shortened even further, a total volume of tilt actuation assembly 740 may be reduced, and packaging mass may be further eliminated. For instance, as actuator cap 744 does not need to protect actuator 742 from the external environment outside tilt actuation housing 741, it may be altered or in some cases eliminated. Therefore, embodiments of the present disclosure may provide compact packaging with reduced mass, simpler power and control connections, fewer relatively moving parts and less cabling.

Embodiments of the present disclosure may further be described by the following clauses:

1. A tilt actuation apparatus for tilting a propulsion system of an aircraft, the tilt actuation apparatus comprising:
   a tilt actuator comprising a rotor;
   a planetary gear set comprising a sun gear, a plurality of planetary gears, a planetary carrier, and a ring gear, wherein the rotor is coupled to the sun gear;
   a worm gear concentrically coupled to an output of the planetary gear set;
   a worm wheel meshed with the worm gear,
   a gear shaft concentrically coupled to the worm wheel;
   a pinion concentrically coupled to the gear shaft;
   a sector gear meshed with the pinion; and
   an output shaft coupled to the sector gear, the output shaft configured to be fixed to a frame of the aircraft.
2. The tilt actuation apparatus of clause 1, wherein the planetary carrier comprises the output of the planetary gear set that is coupled to the worm gear.
3. The tilt actuation apparatus of clause 1 or 2, wherein the worm gear comprises a globoid gear.
4. The tilt actuation apparatus of any of clauses 1 to 3, wherein the worm gear is configured to support the tilt actuation apparatus at a fixed tilt angle.
5. The tilt actuation apparatus of any of clauses 1 to 4, wherein the pinion comprises a helical gear.
6. The tilt actuation apparatus of any of clauses 1 to 5, wherein the sector gear comprises a helical gear.
7. The tilt actuation apparatus of any of clauses 1 to 6, wherein the sector gear comprises a spur gear.
8. The tilt actuation apparatus of any of clauses 1 to 7, further comprising:
   a cam coupled to the gear shaft, the cam configured to actuate a pitch control rod according to a rotation of the gear shaft.
9. The tilt actuation apparatus of any of clauses 1 to 8, wherein the pinion drives the sector gear to rotate the propulsion system about the pivot location.
10. The tilt actuation apparatus of any of clauses 1 to 9, wherein a maximum tilt angle of the tilt actuation apparatus is configured to maintain a clearance between the aircraft and a propeller of the propulsion system.
11. The tilt actuation apparatus of any of clauses 1 to 10, wherein the tilt actuator is located between the worm gear and the propulsion system.
12. The tilt actuation apparatus of any of clauses 1 to 11, further comprising a linear damper configure to dampen a tilt motion of the propulsion system.
13. The tilt actuation apparatus of any of clauses 1 to 12, further comprising a tilt angle sensor configured to detect a tilt angle of the tilt actuation apparatus.
14. The tilt actuation apparatus of clause 13, wherein the tilt angle sensor comprises a proximity sensor.
15. The tilt actuation apparatus of any of clauses 1 to 14, further comprising:
   an idler gear coupled to the output of the planetary gear set;
   a secondary load path gear coupled to the idler gear;
   a second worm gear concentrically coupled to an output of the secondary load path gear;
   a second worm wheel meshed with the second worm gear,
   a second gear shaft concentrically coupled to the second worm wheel;
   a second pinion concentrically coupled to the second gear shaft;
   a second sector gear meshed with the second pinion;
   a second output shaft coupled to the second sector gear, the second output shaft configured to be fixed to the frame of the aircraft.
16. The tilt actuation apparatus of clause 15, further comprising:
   a second tilt actuator comprising a second rotor;
   a second planetary gear set comprising a second sun gear, a second plurality of planetary gears, a second planetary carrier, and a second ring gear, wherein the second rotor is coupled to the second sun gear,
   wherein the secondary load path gear comprises an output of the second planetary gear set.
17. The tilt actuation apparatus of clause 16, further comprising:
   a controller configured exert a first torque on the idler gear from the first tilt actuator and exert a second torque on the idler gear from the second tilt actuator,
   wherein the first torque and the second torque are substantially equal and opposite.
18. The tilt actuation apparatus of clause 16, wherein either of the first tilt actuator or the second tilt actuator is configured to drive the tilt actuation apparatus without the other of the first tilt actuator or the second tilt actuator.
19. The tilt actuation apparatus of clause 15, wherein the gear shaft comprises the second gear shaft.
20. A tilt apparatus of an aircraft, comprising:
   a first frame;
   a second frame moveably coupled to the first frame;
   a propulsion system mounted on the second frame;
   a tilt actuator coupled to the second frame, the tilt actuator comprising a rotor;

a planetary gear set comprising a sun gear, a plurality of planetary gears, a planetary carrier, and a ring gear, wherein the rotor is coupled to the sun gear;
a worm gear concentrically coupled to an output of the planetary gear set;
a worm wheel meshed with the worm gear,
a gear shaft concentrically coupled to the worm wheel;
a pinion concentrically coupled to the gear shaft;
a sector gear meshed with the pinion; and
an output shaft coupled to the sector gear, the output shaft being fixed to the first frame.

21. The tilt apparatus of clause 20, further comprising:
a motor of the propulsion system; and
an inverter configured to drive the motor.

22. The tilt apparatus of clause 20 or 21, further comprising a tilt actuator controller configured to control the tilt actuator.

23. The tilt apparatus of clause 22, wherein the inverter comprises the tilt actuator controller.

24. The tilt apparatus of clause 22, wherein the inverter comprises a sensor configured to provide feedback information to the tilt actuator controller.

25. The tilt apparatus of clause 24, wherein the sensor comprises a tilt angle sensor, the tilt angle sensor comprising a proximity sensor configured to measure a relative distance to a cam surface.

26. The tilt apparatus of any of clauses 21 to 25, wherein the inverter is configured to supply electrical power to the tilt actuator.

27. The tilt apparatus of any of clauses 21 to 26, wherein the inverter is configured to supply a common voltage to the motor and the tilt actuator.

28. The tilt apparatus of any of clauses 21 to 27, wherein the inverter comprises a common busbar electrically coupled to the motor and the tilt actuator.

29. The tilt apparatus of any of clauses 21 to 28, wherein the planetary gear set comprises a gear reduction ratio of between 2:1 and 5:1.

30. The tilt apparatus of any of clauses 21 to 29, wherein the worm gear and the worm wheel comprise a gear reduction ratio of between 20:1 and 40:1.

31. The tilt apparatus of any of clauses 21 to 30, wherein the second frame comprises a housing of the planetary gear set, the worm gear, the worm wheel, the gear shaft, the pinion, the sector gear, or the output shaft.

32. The tilt apparatus of any of clauses 21 to 31, further comprising a housing configured to house the inverter and one of the planetary gear set, the worm gear, the worm wheel, the gear shaft, the pinion, the sector gear, or the output shaft.

33. A tilt apparatus of an aircraft, comprising:
a first frame;
a second frame moveably coupled to the first frame;
a propulsion system mounted on the second frame;
a first tilt actuator coupled to the second frame, the first tilt actuator comprising a first rotor;
a first planetary gear set comprising a first sun gear, a first plurality of planetary gears, a first planetary carrier, and a first ring gear, wherein the first rotor is coupled to the first sun gear;
a first worm gear concentrically coupled to an output of the first planetary gear set;
a first worm wheel meshed with the first worm gear,
a first gear shaft concentrically coupled to the first worm wheel;
a first pinion concentrically coupled to the first gear shaft;
a first sector gear meshed with the first pinion;
a first output shaft coupled to the first sector gear, the first output shaft being fixed to the first frame;
a second tilt actuator comprising a second rotor;
a second planetary gear set comprising a second sun gear, a second plurality of planetary gears, a second planetary carrier, and a second ring gear, wherein the second rotor is coupled to the second sun gear;
a second worm gear concentrically coupled to an output of the second planetary gear set;
a second worm wheel meshed with the second worm gear,
a second gear shaft concentrically coupled to the second worm wheel;
a second pinion concentrically coupled to the second gear shaft;
a second sector gear meshed with the second pinion; and
a second output shaft coupled to the second sector gear, the second output shaft being fixed to the first frame.

34. A tilt apparatus of an aircraft, comprising:
a first frame;
a second frame moveably coupled to the first frame;
a propulsion system mounted on the second frame;
a first tilt actuator;
a tilt actuator gearbox coupled to the second frame, the tilt actuator gearbox comprising:
a first gear stage coupled to the first tilt actuator;
a second gear stage coupled to the first gear stage; and
a third gear stage coupled to the second gear stage and the first frame.

35. The tilt apparatus of clause 34, wherein the first gear stage comprises a gear reduction ratio of between 2:1 and 5:1.

36. The tilt apparatus of clause 35, wherein the first gear stage comprises a gear reduction ratio of between 3:1 and 4:1.

37. The tilt apparatus of any of clauses 34 to 36, wherein the second gear stage comprises a gear reduction ratio of between 20:1 and 40:1.

38. The tilt apparatus of clause 37, wherein the second gear stage comprises a gear reduction ratio of between 28:1 and 35:1

39. The tilt apparatus of any of clauses 34 to 38, wherein the third gear stage comprises a gear reduction ratio of between 2:1 and 5:1

40. The tilt apparatus of clause 39, wherein the third gear stage comprises a gear reduction ratio of between 3:1 and 4:1.

41. The tilt apparatus of any of clauses 34 to 40, wherein the tilt actuator gearbox comprises a gear reduction ratio of between 250:1 and 500:1.

42. The tilt apparatus of any of clauses 34 to 41, wherein the first gear stage comprises:
a first planetary gear set comprising a first sun gear, a first plurality of planetary gears, a first planetary carrier, and a first ring gear, wherein a first rotor of the first tilt actuator is coupled to the first sun gear.

43. The tilt apparatus of any of clauses 34 to 43, wherein the second gear stage comprises:
a first worm gear concentrically coupled to an output of the first planetary gear set;
a first worm wheel meshed with the first worm gear; and
a first gear shaft concentrically coupled to the first worm wheel.

44. The tilt apparatus of any of clauses 34 to 43, wherein the third gear stage comprises:
 a first pinion concentrically coupled to the first gear shaft;
 a first sector gear meshed with the first pinion; and
 a first output shaft coupled to the first sector gear, the first output shaft being fixed to the first frame.
45. The tilt apparatus of any of clauses 34 to 44, further comprising:
 a second tilt actuator,
 the gearbox further comprising:
 a fourth gear stage coupled to the second tilt actuator;
 a fifth gear stage coupled to the fourth gear stage; and
 a sixth gear stage coupled to the fifth gear stage and the first frame.
46. The tilt apparatus of clause 45, wherein:
 the first gear stage and the fourth gear stage comprise substantially equal gear ratios;
 the second gear stage and the fifth gear stage comprise substantially equal gear ratios, and
 the third gear stage and the sixth gear stage comprise substantially equal gear ratios.
47. A tilt apparatus of an aircraft, comprising:
 a first frame;
 a second frame moveably coupled to the first frame;
 a propulsion system coupled to the second frame and configured to move with the second frame, the propulsion system comprising:
  a propeller;
  a motor configured to rotate the propeller, and
  a propulsion inverter configured to supply current to the motor;
 a tilt actuation system coupled to the second frame and configured to move with the second frame with respect to the first frame, the tilt actuation system comprising:
  a tilt actuator;
  a tilt actuator inverter configured to supply current to the tilt actuator, and
  a tilt actuator gearbox coupled to the second frame,
 wherein the tilt actuator is configured to the tilt the second frame with respect to the first frame via the tilt actuator gearbox.
48. The tilt apparatus of clause 47, further comprising:
 a DC input and filter module configured to supply electrical power to the propulsion inverter and the tilt actuator inverter.
49. The tilt apparatus of clause 48, wherein the DC input and filter module is configured to supply the propulsion inverter and the tilt actuator inverter with a common voltage.
50. The tilt apparatus of any of clauses 47 to 49, wherein the propulsion inverter and the tilt actuator inverter are coupled to a common busbar.
51. The tilt apparatus of any of clauses 47 to 50, wherein the propulsion inverter and a component of the tilt actuation system are co-packaged in a common housing.
52. The tilt apparatus of clause 51, wherein the component of the tilt actuation system comprises one of a tilt actuator, tilt actuator wiring, the tilt actuator inverter, or a gear of the tilt actuator gearbox.
53. The tilt apparatus of any of clauses 47 to 52, wherein the tilt actuator is located between the motor and the tilt actuator gearbox.
54. The tilt apparatus of any of clauses 47 to 53, wherein the tilt actuator inverter is located between the motor and the tilt actuator gearbox.
55. The tilt apparatus of any of clauses 47 to 54, further comprising:
 a second tilt actuator, wherein the wherein the second tilt actuator is further configured to the tilt the second frame with respect to the first frame via the tilt actuator gearbox.
56. The tilt apparatus of clause 55, wherein:
 the gearbox comprises a first torque path from the tilt actuator to the first frame and a second torque path from the second tilt actuator to the first frame.
57. A method for tilting a propulsion system of an aircraft, comprising:
 tilting a first frame with respect to a second frame using a tilt actuation apparatus, wherein:
  the first frame is coupled to a body of the aircraft, and
  the second frame is coupled to a propeller, a motor assembly configured to rotate the propeller, and the tilt actuation apparatus;
 wherein the tilt actuation apparatus comprises:
  a tilt actuator comprising a rotor;
  a planetary gear set comprising a sun gear, a plurality of planetary gears, a planetary carrier, and a ring gear, wherein the rotor is coupled to the sun gear;
  a worm gear concentrically coupled to an output of the planetary gear set;
  a worm wheel meshed with the worm gear,
  a gear shaft concentrically coupled to the worm wheel;
  a pinion concentrically coupled to the gear shaft;
  a sector gear meshed with the pinion; and
  an output shaft coupled to the sector gear, the output shaft configured to be fixed to a frame of the aircraft.
58. The method of clause 57, wherein the planetary carrier comprises the output of the planetary gear set that is coupled to the worm gear.
59. The method of clause 57 or 58, wherein the worm gear comprises a globoid gear.
60. The method of any of clauses 57 to 59, wherein the worm gear is configured to support the tilt actuation apparatus at a fixed tilt angle.
61. The method of any of clauses 57 to 60, wherein the pinion comprises a helical gear.
62. The method of any of clauses 57 to 61, wherein the sector gear comprises a helical gear.
63. The method of any of clauses 57 to 62, wherein the sector gear comprises a spur gear.
64. The method of any of clauses 57 to 63, further comprising:
 a cam coupled to the gear shaft, the cam configured to actuate a pitch control rod according to a rotation of the gear shaft.
65. The method of any of clauses 57 to 64, wherein the pinion drives the sector gear to rotate the propulsion system about the pivot location.
66. The method of any of clauses 57 to 65, wherein a maximum tilt angle of the tilt actuation apparatus is configured to maintain a clearance between the body of the aircraft and the propeller.
67. The method of any of clauses 57 to 66, wherein the tilt actuator is located between the worm gear and the propulsion system.

68. The method of any of clauses 57 to 67, further comprising a linear damper configure to dampen a tilt motion of the propulsion system.
69. The method of any of clauses 57 to 68, further comprising a tilt angle sensor configured to detect a tilt angle of the tilt actuation apparatus.
70. The method of clause 69, wherein the tilt angle sensor comprises a proximity sensor.
71. The method of any of clauses 57 to 70, wherein the tilt actuation apparatus further comprises:
 an idler gear coupled to the output of the planetary gear set;
 a secondary load path gear coupled to the idler gear;
 a second worm gear concentrically coupled to an output of the secondary load path gear;
 a second worm wheel meshed with the second worm gear,
 a second gear shaft concentrically coupled to the second worm wheel;
 a second pinion concentrically coupled to the second gear shaft;
 a second sector gear meshed with the second pinion;
 a second output shaft coupled to the second sector gear, the second output shaft configured to be fixed to the frame of the aircraft.
72. The method of clause 71, further comprising:
 a second tilt actuator comprising a second rotor;
 a second planetary gear set comprising a second sun gear, a second plurality of planetary gears, a second planetary carrier, and a second ring gear, wherein the second rotor is coupled to the second sun gear,
 wherein the secondary load path gear comprises an output of the second planetary gear set.
73. The method of clause 72, further comprising:
 a controller configured exert a first torque on the idler gear from the first tilt actuator and exert a second torque on the idler gear from the second tilt actuator,
 wherein the first torque and the second torque are substantially equal and opposite.
74. The method of clause 72, wherein either of the first tilt actuator or the second tilt actuator is configured to drive the tilt actuation apparatus without the other of the first tilt actuator or the second tilt actuator.
75. The method of clause 71, wherein the gear shaft comprises the second gear shaft.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

What is claimed is:

1. A tilt apparatus of an aircraft, comprising: a first frame;
 a second frame moveably coupled to the first frame;
 a propulsion system mounted to the second frame and configured to move with the second frame, the propulsion system comprising:
  a propeller;
  a motor configured to rotate the propeller, and
  a propulsion inverter configured to supply current to the motor;
 a tilt actuation system mounted to the second frame and configured to tilt with the second frame with respect to the first frame, the tilt actuation system comprising:
  a first tilt actuator;
  a second tilt actuator;
  a tilt actuator inverter configured to supply current to the first tilt actuator; and
  a tilt actuator gearbox mounted to the second frame and configured to tilt with the second frame,
 wherein the first tilt actuator and the second tilt actuator are configured to tilt the second frame with respect to the first frame via the tilt actuator gearbox.

2. The tilt apparatus of claim 1, further comprising:
 a DC input and filter module configured to supply electrical power to the propulsion inverter and the tilt actuator inverter.

3. The tilt apparatus of claim 2, wherein the DC input and filter module is configured to supply the propulsion inverter and the tilt actuator inverter with a common voltage.

4. The tilt apparatus of claim 1, wherein the propulsion inverter and the tilt actuator inverter are coupled to a common busbar.

5. The tilt apparatus of claim 1, wherein the propulsion inverter supplies power to the tilt actuator inverter.

6. The tilt apparatus of claim 1, further comprising a common controller configured to control both the propulsion inverter and the tilt actuator inverter.

7. The tilt apparatus of claim 1, further comprising a common circuit board shared by both the propulsion inverter and the tilt actuator inverter.

8. The tilt apparatus of claim 1, wherein the propulsion inverter and a component of the tilt actuation system are co-packaged in a common housing.

9. The tilt apparatus of claim 8, wherein the component of the tilt actuation system comprises at least one of the first tilt actuator, the second tilt actuator, wiring of the first tilt actuator, wiring of the second tilt actuator, the tilt actuator inverter, or a gear of the tilt actuator gearbox.

10. The tilt apparatus of claim 1, wherein the first tilt actuator is located between the motor and a gear of the tilt actuator gearbox.

11. The tilt apparatus of claim 1, wherein the tilt actuator inverter is located between the motor and a gear of the tilt actuator gearbox.

12. The tilt apparatus of claim 1, wherein:
 the tilt actuator gearbox comprises a first torque path from the first tilt actuator to the second frame and a second torque path from the second tilt actuator to the second frame.

13. The tilt apparatus of claim 1, wherein the propulsion inverter has a propulsion inverter sampling rate;
 the tilt actuation inverter has a tilt actuation inverter sampling rate; and
 the propulsion inverter sampling rate is synchronized with the tilt actuation inverter sampling rate.

14. The tilt apparatus of claim 1, further comprising at least one of:
 the propulsion system comprises a propulsion system sensor, data from the propulsion system sensor being shared with the tilt actuation system, or
 the tilt actuation system comprises a tilt actuation system sensor, data from the tilt actuation system sensor being shared with the propulsion system.

15. The tilt apparatus of claim 1, wherein the propulsion inverter and the first tilt actuator are configured to maintain a fixed separation though an entire range of tilt of the second frame with respect to the first frame.

16. The tilt apparatus of claim 1, wherein the first frame is coupled to a boom of the aircraft.

17. The tilt apparatus of claim 1, wherein tilting the second frame with respect to the first frame via the tilt actuator gearbox comprises tilting the propulsion system between a lift configuration and a cruise configuration.

18. The tilt apparatus of claim 1, wherein the second tilt actuator is located between the motor and a gear of the tilt actuator gearbox.

19. The tilt apparatus of claim 1, wherein the first tilt actuator and the second tilt actuator are located between the motor and a gear of the tilt actuator gearbox.

20. The tilt apparatus of claim 1, wherein the propulsion inverter and the second tilt actuator are configured to maintain a fixed separation though an entire range of tilt of the second frame with respect to the first frame.

21. The tilt apparatus of claim 1, wherein the propulsion inverter, the first tilt actuator, and the second tilt actuator are configured to maintain a fixed separation though an entire range of tilt of the second frame with respect to the first frame.

22. An aircraft, comprising:
- a boom;
- a first frame coupled to the boom;
- a second frame moveably coupled to the first frame;
- a propulsion system mounted to the second frame and configured to move with the second frame, the propulsion system comprising:
  - a propeller;
  - a motor configured to rotate the propeller, and
  - a propulsion inverter configured to supply current to the motor; a tilt actuation system mounted to the second frame and configured to tilt with the
- second frame with respect to the first frame, the tilt actuation system comprising:
  - a first tilt actuator;
  - a second tilt actuator;
  - a tilt actuator inverter configured to supply current to the first tilt actuator; and
  - a tilt actuator gearbox mounted to the second frame and configured to tilt with the second frame,
- wherein the first tilt actuator and the second tilt actuator are configured to tilt the second frame with respect to the first frame via the tilt actuator gearbox.

23. The tilt apparatus of claim 22, wherein the propulsion inverter has a propulsion inverter sampling rate;
- the tilt actuation inverter has a tilt actuation inverter sampling rate; and
- the propulsion inverter sampling rate is synchronized with the tilt actuation inverter sampling rate.

24. The tilt apparatus of claim 22, further comprising at least one of:
- the propulsion system comprises a propulsion system sensor, data from the propulsion system sensor being shared with the tilt actuation system, or
- the tilt actuation system comprises a tilt actuation system sensor, data from the tilt actuation system sensor being shared with the propulsion system.

25. The tilt apparatus of claim 22, wherein tilting the second frame with respect to the first frame via the tilt actuator gearbox comprises tilting the propulsion system between a lift configuration and a cruise configuration.

26. The tilt apparatus of claim 22, further comprising:
- a DC input and filter module configured to supply electrical power to the propulsion inverter and the tilt actuator inverter.

27. A tilt apparatus of an aircraft, comprising:
- a first frame extending from a leading or trailing edge of an aircraft wing;
- a second frame moveably coupled to the first frame;
- a propulsion system mounted to the second frame and configured to move with the second frame, the propulsion system comprising:
  - a propeller;
  - a motor configured to rotate the propeller, and
  - a propulsion inverter configured to supply current to the motor; a tilt actuation system mounted to the second frame and configured to tilt with the second frame with respect to the first frame, the tilt actuation system comprising:
  - a first tilt actuator;
  - a second tilt actuator;
  - a tilt actuator inverter configured to supply current to the first tilt actuator; and
  - a tilt actuator gearbox mounted to the second frame and configured to tilt with the second frame,
- wherein the first tilt actuator and the second tilt actuator are configured to tilt the second frame with respect to the first frame via the tilt actuator gearbox.

28. The tilt apparatus of claim 27, wherein the propulsion inverter has a propulsion inverter sampling rate;
- the tilt actuation inverter has a tilt actuation inverter sampling rate; and
- the propulsion inverter sampling rate is synchronized with the tilt actuation inverter sampling rate.

29. The tilt apparatus of claim 27, further comprising at least one of:
- the propulsion system comprises a propulsion system sensor, data from the propulsion system sensor being shared with the tilt actuation system, or
- the tilt actuation system comprises a tilt actuation system sensor, data from the tilt actuation system sensor being shared with the propulsion system.

30. The tilt apparatus of claim 27, wherein tilting the second frame with respect to the first frame via the tilt actuator gearbox comprises tilting the propulsion system between a lift configuration and a cruise configuration.

31. The tilt apparatus of claim 27, further comprising:
- a DC input and filter module configured to supply electrical power to the propulsion inverter and the tilt actuator inverter.

32. A tilt apparatus of an aircraft, comprising:
- a first frame;
- a second frame moveably coupled to the first frame;
- a propulsion system coupled to the second frame and configured to move with the second frame, the propulsion system comprising:
  - a propeller;
  - a motor configured to rotate the propeller, and
  - a propulsion inverter configured to supply current to the motor;
- a tilt actuation system coupled to the second frame and configured to tilt with the second frame with respect to the first frame about a single tilt axis that is offset from a thrust line of the propeller, the tilt actuation system comprising:
  - a first tilt actuator;
  - a second tilt actuator;
  - a tilt actuator inverter configured to supply current to the first tilt actuator; and
  - a tilt actuator gearbox mounted to the second frame and configured to tilt with the second frame,
- wherein the first tilt actuator and the second tilt actuator are configured to tilt the second frame with respect to the first frame via the tilt actuator gearbox.

33. The tilt apparatus of claim 32, wherein the propulsion inverter has a propulsion inverter sampling rate;

the tilt actuation inverter has a tilt actuation inverter sampling rate; and the propulsion inverter sampling rate is synchronized with the tilt actuation inverter sampling rate.

34. The tilt apparatus of claim 32, further comprising at least one of:

the propulsion system comprises a propulsion system sensor, data from the propulsion system sensor being shared with the tilt actuation system, or the tilt actuation system comprises a tilt actuation system sensor, data from the tilt actuation system sensor being shared with the propulsion system.

35. The tilt apparatus of claim 32, wherein tilting the second frame with respect to the first frame via the tilt actuator gearbox comprises tilting the propulsion system between a lift configuration and a cruise configuration.

36. The tilt apparatus of claim 32, further comprising:

a DC input and filter module configured to supply electrical power to the propulsion inverter and the tilt actuator inverter.

* * * * *